(12) United States Patent
Malik et al.

(10) Patent No.: US 7,889,701 B2
(45) Date of Patent: Feb. 15, 2011

(54) ACCESS POINT IN A WIRELESS NETWORK MEDIUM ACCESS CONTROL SYSTEM

(75) Inventors: Rahul Malik, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 1439 days.

(21) Appl. No.: 10/563,878

(22) PCT Filed: Jul. 16, 2004

(86) PCT No.: PCT/JP2004/010545
§ 371 (c)(1),
(2), (4) Date: Jan. 9, 2006

(87) PCT Pub. No.: WO2005/008967
PCT Pub. Date: Jan. 27, 2005

(65) Prior Publication Data
US 2006/0164969 A1 Jul. 27, 2006

(30) Foreign Application Priority Data
Jul. 18, 2003 (JP) ............................. 2003-276987

(51) Int. Cl.
*H04W 4/00* (2009.01)
(52) U.S. Cl. .................. 370/334; 370/328; 370/338
(58) Field of Classification Search ............ 370/334, 370/335, 346, 310, 328, 329, 338, 445; 455/456.1–456.6, 455/456
See application file for complete search history.

(56) References Cited
U.S. PATENT DOCUMENTS
5,508,707 A * 4/1996 LeBlanc et al. ............ 342/457

(Continued)

FOREIGN PATENT DOCUMENTS
JP 200226941 1/2002

(Continued)

OTHER PUBLICATIONS

"Part 11: Wireless LAN Medium Access Control (MAC) and Physical Layer (PHY) Specifications," Information Technology, Telecommunications and Information Exchange between Systems, Local and Metropolitan Area Networks, Specific Requirements, LAN MAN Standards Committee of the IEEE Computer Society, http://standards.ieee.org/getieee802/download/802.11-1999.pdf, ANSI/IEEE Std 802.11, 1999 Edition(R2003), 528 pages total, Aug. 1999.

(Continued)

*Primary Examiner*—Matthew Sams
(74) *Attorney, Agent, or Firm*—Dickinson Wright PLLC

(57) ABSTRACT

A method and system are disclosed that can be applied to achieve high-throughput in a WLAN. Central to the present invention is the use of an SDMA compatible multi-beam antenna system by a WLAN access point. A system based on two types of antennas-dynamic beam forming and fixed beam antennas—is described. A mechanism and protocol are described that implement simultaneous transmissions with respect to an SDMA compatible access point and thereby improve spectral efficiency, and by extension achieve higher throughput. Based on the recognition that current WLAN MAC has major limitations in throughput, certain MAC extensions (that can be applied independently of SDMA) are described. Also disclosed are power-saving and power control techniques that improve battery performance and contribute to a reduction in station size, and a means of reducing channel interference. The present invention also deals with the problem of backward compatibility with conventional devices that implement the protocol that is a subset covered by the present invention.

14 Claims, 12 Drawing Sheets

U.S. PATENT DOCUMENTS

| | | | |
|---|---|---|---|
| 6,731,954 B1* | 5/2004 | Katz | 455/562.1 |
| 6,865,185 B1* | 3/2005 | Patel et al. | 370/412 |
| 6,983,167 B2* | 1/2006 | Adachi et al. | 455/522 |
| 7,301,924 B1* | 11/2007 | Gurbuz et al. | 370/335 |
| 2001/0046882 A1* | 11/2001 | Karimi et al. | 455/561 |
| 2001/0055275 A1 | 12/2001 | Herrmann et al. | |
| 2002/0051430 A1 | 5/2002 | Kasami et al. | |
| 2003/0036404 A1 | 2/2003 | Adachi et al. | |
| 2004/0029620 A1* | 2/2004 | Karaoguz | 455/574 |

FOREIGN PATENT DOCUMENTS

| | | |
|---|---|---|
| JP | 2002208889 | 7/2002 |
| JP | 2002-247053 | 8/2002 |
| JP | 2003124878 | 4/2003 |

OTHER PUBLICATIONS

"Part 11: Wireless LAN Medium Access Control (MAC) and Physical Layer (PHY) Specifications: Higher-Speed Physical Layer Extension in the 2.4 Ghz Band," Supplement to IEEE Standard for Information Technology, Telecommunications and Information Exchange between Systems, Local and Metropolitan Area Networks, Specific Requirements, IEEE Std 802.11b-1999, 95 pages total, Sep. 1999.

"Part 11: Wireless LAN Medium Access Control (MAC) and Physical Lay (PHY) Specifications: High-Speed Physical Layer in the 5 Ghz Band," Corrections to Supplement to IEEE Standard for Information Technology, Telecommunications and Information Exchange between Systems, Local and Metropolitan Area Networks, Specific Requirements, IEEE Std 802.11a-1999, pp. 1-14, Sep. 1999.

Y. Xiao, et al., "Throughput Analysis for IEEE 802.11a Higher Data Rates," IEEE 802.11-02/138r0, 20 pages total, Mar. 2002.

J. Rosdahl, et al., "Draft PAR for High Throughput Study Group," IEEE 802.11-02/798r7, pp. 1-9, Nov. 2002.

E. Perahia, et al., "Backward Compatibility Case Studies," IEEE 802.11-03/307r0, 13 pages total, May 2003.

J. del Prado, et al., "Application Characteristics for HT Usage Scenarios," IEEE 802.11-03/346r0, 9 pages total, May 2003.

"Part 11: Wireless Medium Access Control (MAC) and Physical Layer (PHY) Specifications: Medium Access Control (MAC) Enhancements for Quality or Service (QoS)," Draft Supplement to Standard for Telecommunications and Information Exchange Between Systems, LAN/MAN Specific Requirements, IEEE Std 802.11e/D4.2, 140 pages total, Feb. 2003.

PCT International Search Report dated Oct. 26, 2004.

International Search Report dated Oct. 26, 2004.

* cited by examiner

X: STA

ACCESS POINT IN A WIRELESS NETWORK MEDIUM ACCESS CONTROL SYSTEM

TECHNICAL FIELD

The present invention relates to a medium access control method and system in a wireless network. More particularly, the present invention describes a protocol for a new type of WLAN (wireless local area network) characterized by high-throughput by existing WLAN devices by using SDMA (space division multiple access) compatible access points. This system provides service simultaneously to a plurality of users scattered spatially, and as a result, the effective throughput of a WLAN increases a maximum "n-fold" (where "n" is the number of beams and the number of transmitting/receiving sections that an AP (access point) can support at the same time).

BACKGROUND ART

There are a variety of application areas for WLANs. For example, there are cases where a user in a company normally uses a notebook computer on the desktop, but sometimes moves to a conference room or the like, or cases where an access point connected to a home AV server comprising a plurality of devices such as a set-top box, media player, Internet portal, or a display panel, camera, notebook computer, or the like equipped with a wireless access device, accesses media stored on the Internet or a home AV server. A WLAN can also be applied to a cellular hotspot in the lobby of an office building, a coffee shop, or the like, accessed by mobile users of data services.

IEEE802.11 (see Non-Patent Document 1) is a highly cost-effective solution that provides wireless connection of computers and other devices to a network. Through new developments in signal processing and modulation techniques, the standard has been extended to support a new physical layer at a higher data transfer rate (see Non-Patent Document 2 and Non-Patent Document 3). According to research, a major restriction of present 802.11 systems is the MAC (medium access control) layer, and as a result, saturation of throughput associated with increased data transfer rates occurs (see Non-Patent Document 4). The IEEE802.11 Working Group has confirmed the necessity of high-throughput WLANs based on MAC and PHY (physical layer) changes with respect to current WLANs (see Non-Patent Document 5). One important issue highlighted is the necessity of support/recognition of current systems (see Non-Patent Document 5 and Non-Patent Document 6).

Non-Patent Document 1 through Non-Patent Document 6 referred to here are as follows.

Non-Patent Document 1: "Local and Metropolitan Area Networks-Specific Requirements-Part 11: Wireless LAN Medium Access Control (MAC) and Physical Layer (PHY) specifications", IEEE Std 802.11-1999, IEEE, August 1999

Non-Patent Document 2: "Local and Metropolitan Area Networks-Specific Requirements-Part 11: Wireless LAN Medium Access Control (MAC) and Physical Layer (PHY) specifications: Higher-Speed Physical Layer Extension in the 2.4 GHz Band", IEEE Std 802.11b-1999, IEEE, September 1999

Non-Patent Document 3: "Local and Metropolitan Area Networks-Specific Requirements-Part 11: Wireless LAN Medium Access Control (MAC) and Physical Layer (PHY) specifications: Higher-Speed Physical Layer Extension in the 5 GHz Band", IEEE Std 802.11a-1999, IEEE, September 1999

Non-Patent Document 4: Y. Xiao & J. Rosdahl, "Throughput Analysis for IEEE 802.11a Higher Data Rates", doc.: IEEE 802.11/02-138r0, March 2002 Non-Patent Document 5: J. Rosdahl et al, "Draft Project Allocation Request (PAR) for High-throughput Study Group", doc.: IEEE 802.11/02-798r7, March 2003 Non-Patent Document 6: E. Perahia, A. Stephens, S. Coffey, "Backward Compatibility Case Studies", doc.: IEEE 802.11-03/307r0, May 2003

Based on current applications and applications envisaged for the future, data transfer rates supported by existing WLANs are sufficient (see Non-Patent Document 7: J. del Prado, K. Challapali, S Shankar and P. Li, "Application Characteristics for HT Usage Scenarios", doc.: IEEE 802.11-03/346r0, May 2003). As WLANs traditionally comprise time division multiple access devices, the number of high-speed data transfer application users that can be simultaneously supported by a network is a problem. This problem can be generalized as a problem of the need for higher throughput. A means of achieving higher throughput is to increase the data transfer rate measured in a higher layer than layer 2 based on the International Organization for Standardization (ISO) Open Systems Interconnection (OSI) model, or the medium access control layer. In order to satisfy the conditions necessary for increasing the total throughput of all wireless stations of one basic service set comprising a single wireless access point and a plurality of wireless stations, the throughput of a wireless LAN system is measured at an access point.

While increasing the RF spectrum used would be one solution, this is not an option. This is because the available spectrum is a limited resource, and has already been deployed for other applications. Also, due to the necessity for backward compatibility with current devices, new systems must conform to spectrum masking and already used channelization.

DISCLOSURE OF INVENTION

It is an object of the present invention to provide a wireless network medium access control method and system that enable total network throughput to be improved.

The present invention resolves the above problem by using a protocol and system based on an access point equipped with a multi-beam antenna capable of executing SDMA. An AP using SDMA enables service to be provided simultaneously to a plurality of WLAN users on channels of the same frequency by utilizing the spatial selectivity of the AP antenna. The total throughput of a WLAN network can be improved according to the number of simultaneous antenna beams that can be formed by an AP at the same time, and the number of transceivers that can be used by an AP.

In order to improve throughput, the present invention describes extension with respect to the MAC sublayer and PHY. Changes with respect to MAC are grounded on intrinsic requirements for a TDMA/TD system based on a multi-beam antenna system. A technology is also disclosed whereby, when a new system is developed, if it is applied to a WLAN that does not specifically use SDMA, throughput is improved and at the same time more efficient power consumption is achieved.

The present invention can be applied to an 802.11 compliant WLAN comprising an SDMA compatible AP equipped with a multi-beam antenna and a plurality of stations. Both the AP and stations use the protocol described in detail in this document. A station that detects the presence of a WLAN first attempts association with the WLAN. In the present invention, two association procedures are described: (1) for a conventional station, and (2) for a station provided with the new protocol. If association is successful, the AP assigns the station to a specific group, and sets station timing synchronization so that transmission is only possible in the period assigned to that group. Group formation and assignment is performed based on an AP that can determine individual user locations and adapt the beam structure dynamically to a user location, or an AP that uses a fixed beam applied widely to the entire coverage area. In the present invention, a direction/beam search mechanism necessary for group assignment is described. The AP performs synchronization in the case of transmission uplinks and downlinks spanning all beams in all groups. Frame aggregation is performed for downlinks, and bandwidth is saved by eliminating inter-frame gaps and preambles. In the case of uplinks, scheduling-based polling and a supervised contention based access mechanism are described. The access mechanism is disclosed according to which station executes power control and power saving. A technique that minimizes and facilitates detection of input from a noncompliant station (that hinders normal communication on a high-throughput network) is exemplified and described. When the existence of a noncompliant/rogue station is detected, the AP directs that station to transfer to another channel.

The main object of the present invention in its entirety is to describe a WLAN system and protocol, and implement high-throughput.

The present invention makes it clear that an AP is faulty with respect to all traffic in a WLAN. By applying the present invention to a WLAN, throughput is increased "n-fold," and a network can provide service to more users at a faster application data transfer rate and with higher service quality. The technology described in the present invention contributes to improvements in terms of the complexity of implementation from the network to an AP, and from a cost standpoint, while minimizing changes necessary for stations/user devices. The protocol set detailed in the present invention facilitates detection of conventional network devices and their switchover to another channel, and makes possible optimization of throughput on a channel assigned to high-throughput WLAN use. The present invention also covers power control that minimizes the effect of a device using the present invention on other users of the same channel. In the present invention, power saving technology is also described. In general, this technology enables necessary battery conditions to be relaxed, and contributes to the design of smaller and lighter stations/devices.

In conclusion, the present invention can be summarized as having two effects:

(1) increasing the total throughput of a WLAN, and
(2) facilitating the design and manufacture of low-priced user devices/stations with a simple and small form factor.

BEST MODE FOR CARRYING OUT THE INVENTION

Figure 1:
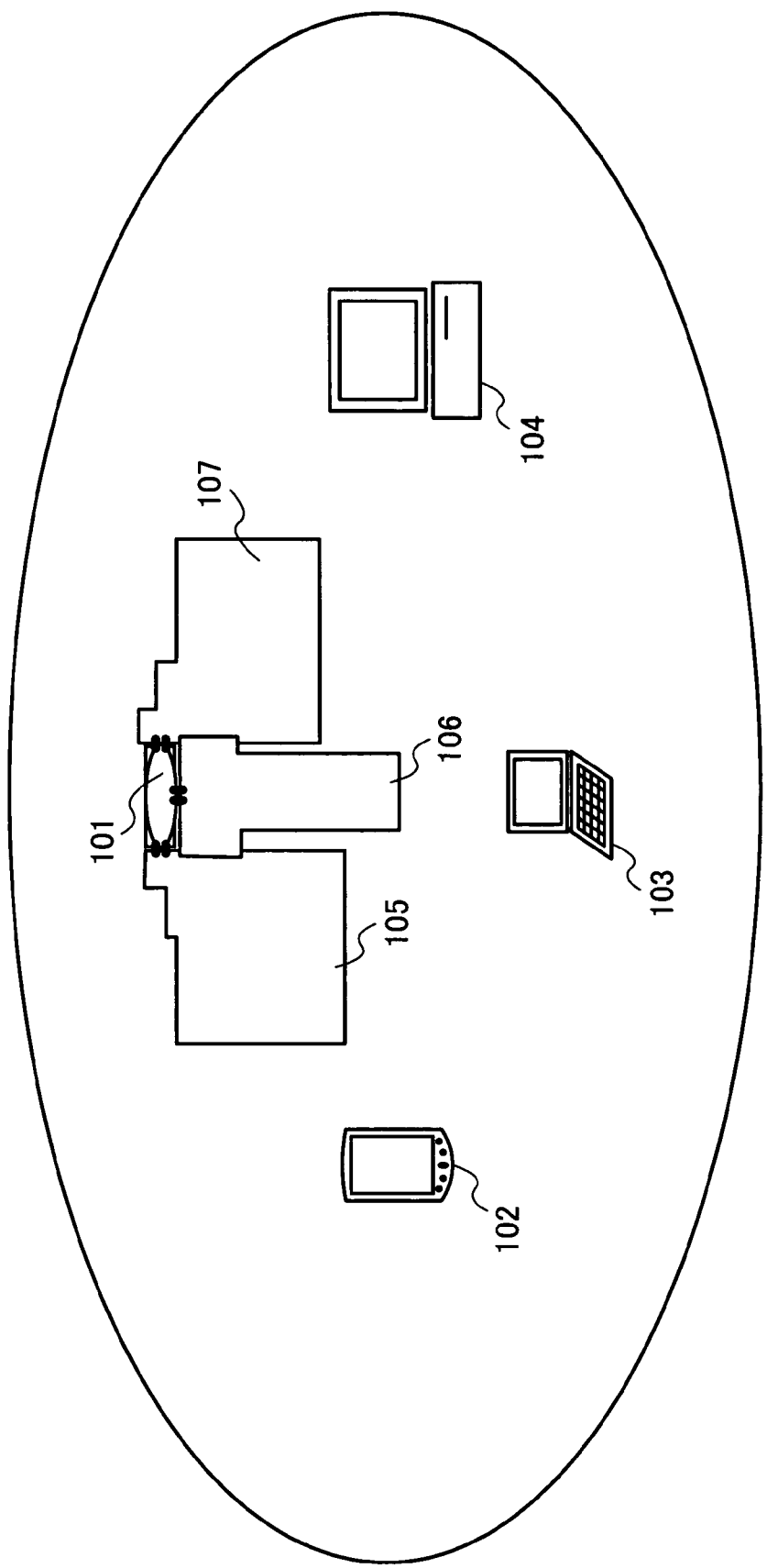
FIG. 1 is a drawing showing an example of a wireless LAN (WLAN) network that uses SDMA and comprises three stations and an SDMA compatible AP.

With reference now to the accompanying drawings, an embodiment of the present invention will be explained in detail below.

There will here be disclosed an apparatus and mechanism for station and access point use in a WLAN network that uses space division multiple access that executes medium access control. The following definitions will be used to facilitate an understanding of the present invention.

"WLAN" means a wireless local area network. A WLAN includes any number of devices or nodes for providing LAN service to mobile stations by means of wireless access technology.

"Station (STA)" means a device capable of accessing a service provided by a WLAN.

"Access point (AP)" means a station in a WLAN that has a role of controlling access to the network and maintaining the timing thereof. As another service, an AP also functions as a bridge for access by a station in the WLAN to a device on another network.

"Space division multiple access (SDMA)" means an access mechanism whereby a plurality of wireless transceivers can communicate using the same spectrum simultaneously, utilizing transceiver functions that transmit/receive signals using physical separation in space and beam directivity.

"Medium" means a wireless channel managed by a WLAN.

"Multi-beam antenna" means an antenna system that can form different beams in different directions in order to minimize crossover/inter-beam interference and implement SDMA.

"Medium access control (MAC) layer" means a network protocol generally used by all stations in order to access a network medium.

"Physical (PHY) layer" means an actual transceiver that transmits/receives signals on a network. This can be generalized so as to be composed of a number of sublayers such as a MAC conversion layer and control layer.

"Beacon frame" is a frame that is transmitted periodically by an AP, and generally indicates the start of a superframe and transmits network-specific information to all STAs in a WLAN.

"Downlink" means a transmit channel on which communication from an access point to a station is generated.

"Uplink" means a transmit channel on which communication from a station to an access point is generated.

"Superframe" means a network frame timing structure that an access point or network coordinator has all related nodes conform to.

"Supervised access mode" means a WLAN superframe operating mode in which each station follows a particular access rule defined by an AP or network coordinator.

"Unsupervised access mode" means a WLAN superframe operating mode in which each station executes rule-free competitive access to a medium.

"Group" means a collection of stations that can be covered simultaneously by formation of one or a plurality of non-overlapping beams.

"Group ID" means an identification signal assigned to each station belonging to a specific group, by means of which a common command (multicast) can be sent to all the stations.

"Group period" means an amount of time in which an AP forms antenna beams and covers a specific user group.

"Beam start beacon frame" means a message transmitted by an AP that notifies the relevant WLAN group and beam users of the start of a group period.

"Beam end beacon frame" means a message transmitted by an AP that notifies users of the relevant group that power is to be turned off during another group period.

"Poll+supervised contention access frame" means a frame transmitted by an AP that notifies a specific group and beam users of the inbound transmission schedule and supervised contention access cycle.

"Response frame interval (RIFS)" is the minimum time interval between consecutive transmissions from different stations in the WLAN. As this is generally shorter than the minimum time necessary for medium preemption, it can be used for a response and confirmation response frame.

"Preemption frame interval (PIFS)" is the time interval that an AP wishing to access a medium monitors. As a PIFS is longer than an RIFS but shorter than a CIFS, the AP can perform higher-priority access than an STA.

"Contention frame interval (CIFS)" is the minimum for which a medium must be observed to be idle before a station begins contention—that is, begins non-polling transmission. CIFS is the longest of the frame intervals.

"Rogue station" is a station that does not fully comply with the WLAN protocol, or a station that is not correctly synchronized with the current LAN timing, and is a station whose behavior is such as to cause a collision or interference on the WLAN.

In the following description, for purposes of explanation, specific numbers, times, structures, protocol names, and other parameters are defined in order to achieve a full understanding of the present invention, but it will be clear to those skilled in the art that the present invention can be implemented without such details. In other examples, well-known configuration parts and modules are shown in block diagrams in order not to make the contents of the present invention unnecessarily vague.

In order to achieve a full understanding of the present invention, operating procedures, information data structures, and computation methods are shown below. While specific data structures are used, these are only intended to give an example of implementation of the present invention. As will be clear to those skilled in the art, when implementing the present invention new information can be added and specific parts omitted in accordance with the actual circumstances of its use.

FIG. 1 shows a typical WLAN network comprising an AP (101) and a plurality of STAs (102 through 104). Due to the importance of portability and mobility, an STA generally uses a small and simple antenna with an omni-directional or nearly omni-directional beam pattern. On the other hand, the access point, which is normally a fixed basic network device, can form different beams (SDMA beams: 105 through 107) separated spatially, minimizing mutual crossover/interference.

Figure 2:
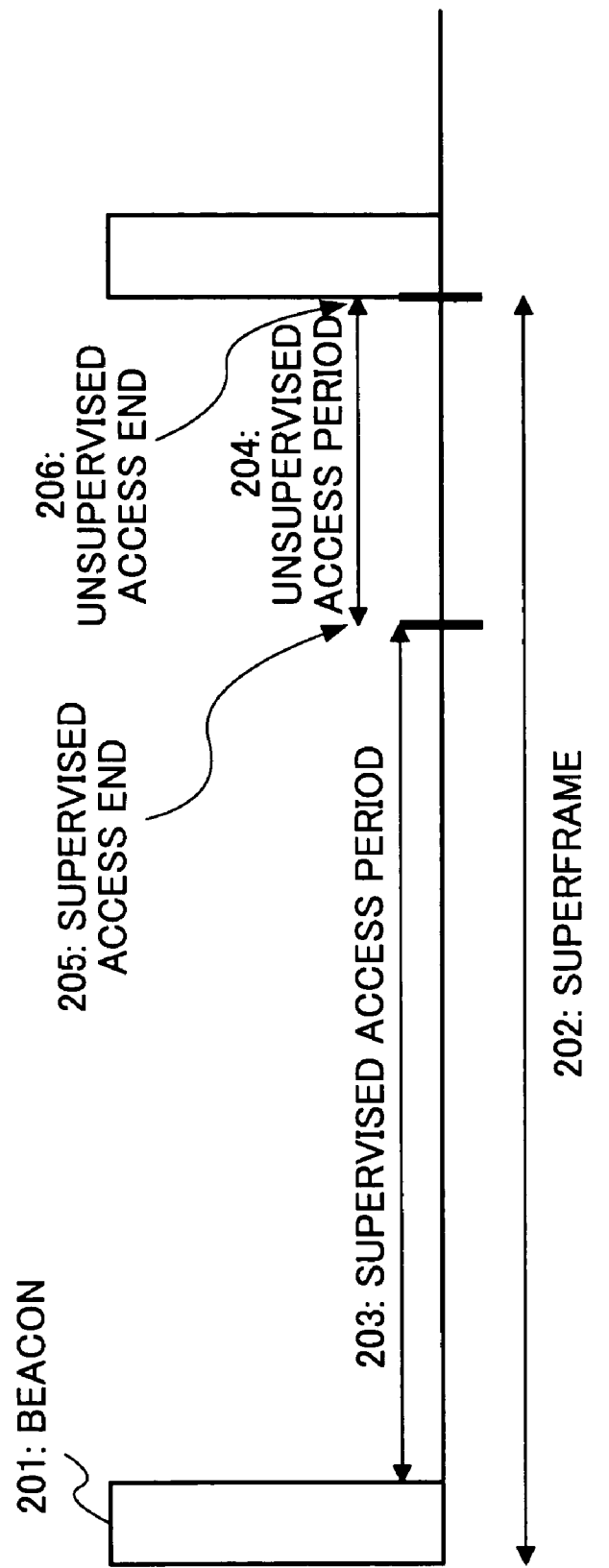
FIG. 2 is a drawing showing the structure of a superframe composed of a supervised access period (control by the AP) and an unsupervised access period, and a method of directing termination of supervised and unsupervised access modes.

An AP equipped with a multi-beam antenna can form an omni-directional beam pattern and can also form a group of beams in different directions. When powered on, an STA executes a wireless network search. An STA first searches for a beacon frame (201) broadcast by the AP at fixed intervals in order to maintain synchronization among STAs and transmit network-specific information. A beacon frame is broadcast periodically in order to synchronize all stations, perform updating of existing stations, and send network-specific information to new stations. The interval between two consecutive beacons is called a superframe (202). In order to fully exploit the characteristics of a multi-beam antenna (AP resident) type WLAN, it is necessary for the AP to adjust beam formation to coordinate the transmit/receive timing of each station, and at the same time to optimize channel band use. An MAC superframe has two kinds of operating modes or periods: (i) a supervised access mode or period (203) (in which the AP uses a multi-beam antenna system), and (ii) an unsupervised access mode or period (204) (in which the AP uses a omni-directional antenna pattern mainly for the purpose of providing service to a conventional station). For the sake of explanation, FIG. 2 shows a superframe divided into one example for each of the two access modes, but this does not exclude a more general case of a plurality of examples of either mode occurring in a superframe. The AP uses a "supervised access end frame" (205) and "unsupervised access end frame" (206) to report termination of the respective access modes. In order to optimize band utilization, these frames can be combined with another frame transmitted by the AP, such as a beacon.

Figure 3:
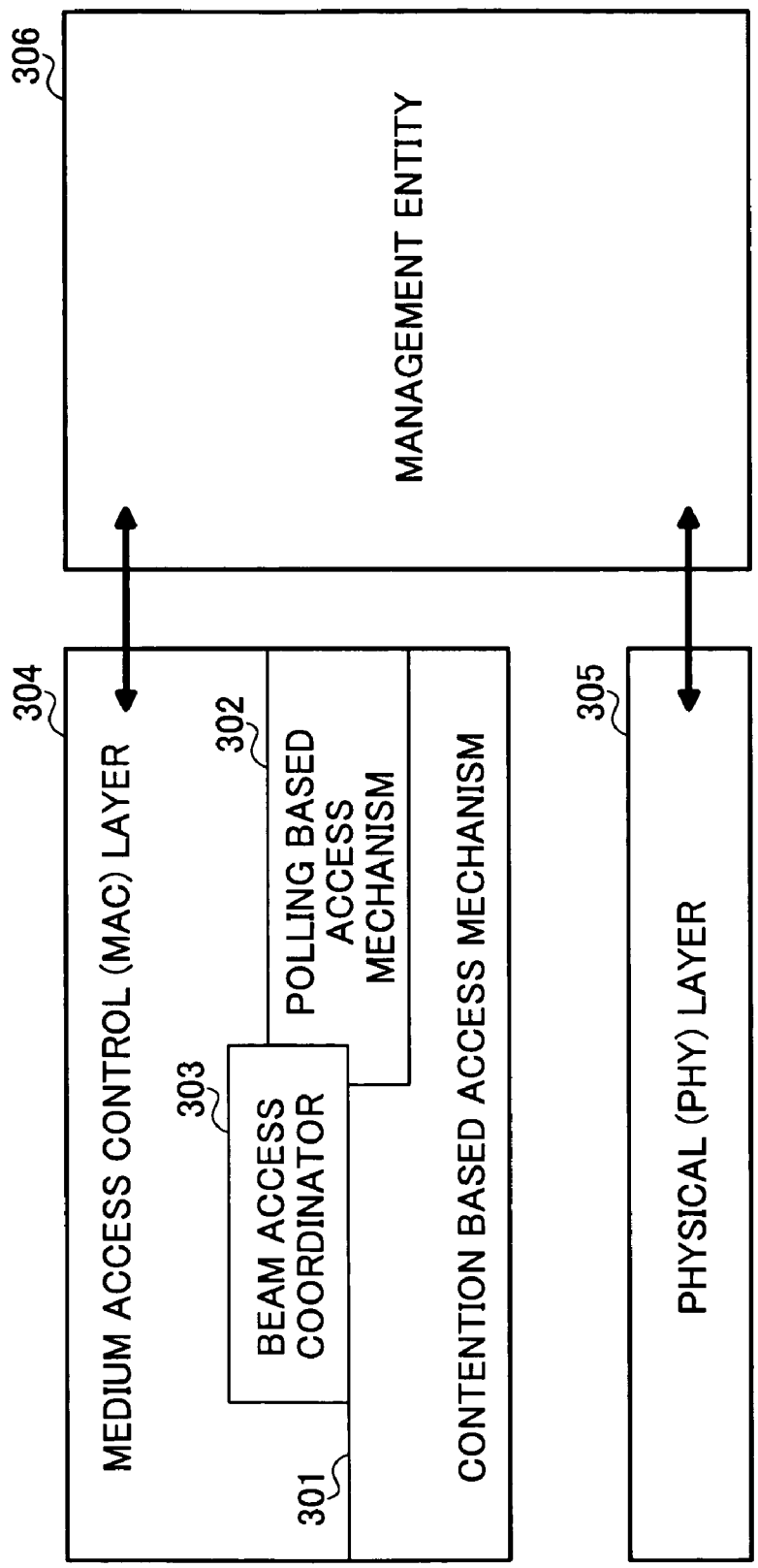
FIG. 3 is a drawing showing a WLAN protocol stack, which is a provided WLAN MAC hierarchical protocol stack.

To make possible data transmission based on the above-described case, high-throughput data transmission in a WLAN is supported using the protocol stack shown in FIG. 3. Medium access control techniques can be broadly divided into two kinds—contention based (301) and polling based (302)—both of which resemble the techniques described in above-cited Non-Patent Document 1 and Non-Patent Document 8 ("Draft Supplement to LAN/MAN Specific Requirements—Part 11: Wireless Medium Access Control (MAC) and Physical Layer (PHY) specifications: MAC Enhancements for Quality of Service (QoS)", IEEE Std 802.11e/D4.2, February 2003). A contention based access mechanism corresponds to the distributed control function (DCF) of Non-Patent Document 1, and the HCF contention based channel access or extended distributed control function (EDCF) of Non-Patent Document 8. Polling based channel access corresponds to the centralized control function (PCF) of Non-Patent Document 1and the HCF control channel access of Non-Patent Document 8. In the above description, HCF means "hybrid control function."

In FIG. 3, a beam access coordinator (303) makes possible WLAN operation in high-throughput mode, and achieves high-throughput by adjusting data transfer between the AP and an STA and making use of the multi-beam antenna function in the network. The protocol stack MAC (304) and PHY (305) entities shown in FIG. 3 are controlled by a management entity (306).

The core of the present invention comprises a beam access coordinator that simplifies the use of the above two coordinator functions and a new access mechanism that implements simultaneous transmission/reception of a plurality of data streams from an AP with multi-beam forming capability. Based on the beam forming function, the management entity (306) using the beam access coordinator further controls data conversion using polling and contention based access mechanisms. A beacon frame is a broadcast communication frame that reports the existence of a WLAN and its ID, and has the role of a timing reference.

A beacon also includes a combination of WLAN functions/characteristics including a protocol reference number (high-throughput station/conventional station), antenna type (omni-directional/directional), antenna type (dynamic beam forming/fixed beam), and direction search function. A beacon frame can be written using the following structure.

```
Beacon
{
    WLAN ID /*unique identifier for the AP & WLAN*/
    WLAN Capability/Protocol Type /*protocol set &
        features of the AP*/
    Beacon Repetition Rate /*rate of recurrence of
        this frame*/
    Supervised Access Duration /*duration of multi-
        beam operation*/
}
```

An Association Request is a command transmitted by an STA requesting association with a specific WLAN, and can include the following information elements.

```
AssociationRequest
{
    WLAN ID /*unique identifier for the AP & WLAN*/
    Group ID /*common identification for a set of
        beams */
    Beam ID /*identification of an individual beam*/
    STA ID/Address /*unique address of the station*/
    STA Capability /*protocol set and features of the
        station */
}
```

An Association Response is a command/frame accepting or denying an STA request, sent by the AP to an STA that previously issued an Association Request. An Association Response can include the following information elements.

```
AssociationResponse
{
    WLAN ID /*unique identifier for the AP & WLAN*/
    Group ID /*common identification for a set of
        beams */
    Beam ID /*identification of an individual beam */
    STA ID/Address /*unique address of the station*/
    Association Status /*result of the association
        request */
}
```

An Acquisition Request is a command transmitted by the AP, requesting a station to transmit a training sequence in order to identify the direction of the AP with reference to the station. Acquisition Request information contents can be written using the following structure.

```
AcquisitionRequest
{
    Source Address (AP) /*unique identification of
        initiator of the frame */
    Destination Address /*unique identification of
        addressed station */
    Duration/Length of Training Sequence
}
```

Group-ID Assign is a command frame sent to a station from the AP, assigning the station to a beam group. Group-ID Assign information contents can be written using the following structure.

```
GroupIDAssign
{
    Source Address (AP) /* unique identification of
        initiator of the frame */
    Destination Address /*unique identification of
        addressed station */
    Group ID /*common identification for a set of
        beams */
    Beam ID /*identification of an individual beam */
}
```

A Beam Start Beacon is a frame that is broadcast to STAs of a specific beam and group and indicates the start of operation of that beam/group, and can include the following information elements.

```
BeamStartBeacon
{
    WLAN ID /*unique identifier for the AP & WLAN*/
    WLAN Capability/Protocol ID /*protocol set &
        features of the WLAN*/
    Group ID /*common identification for a set of
        beams */
    Beam ID /*identification of an individual
        beam */
    Group Duration /*active time for current Group of
beams */
    Group Repetition Rate /*rate of recurrence of
        this frame*/
    Downlink Schedule /*timing structure for downlink
        transmissions */
}
```

A Beam End Beacon is a frame that is broadcast to STAs of a specific beam and group and indicates the end of operation of that beam/group, and can include the following information elements.

```
BeamEndBeacon
{
    WLAN ID /*unique identifier for the AP & WLAN*/
    WLAN Capability/Protocol ID /*protocol set &
        features of the WLAN*/
    Group ID /*common identification for a set of
        beams */
    Beam ID /*identification of an individual beam*/
    Sleep Duration /*duration of inactivity for current
        beam */
}
```

A Poll+Supervised Contention Announcement Frame is a frame that is transmitted by the AP to an STA group of a specific beam, and defines polling based medium access and contention based medium access. The information contained in this frame can be written using the following structure.

```
Poll+SupervisedContentionAnnouncement
{
    {AddressSTA1, GrantTime1, GrantDuration1,
        Grant Type1 }
    {AddressSTA2, GrantTime2, GrantDuration2,
        GrantType2}
    :
    :
    {AddressSTAN, Grant TimeN, GrantDurationN,
        GrantTypeN)
    {Group Address, Grant Time, GrantDuration,
        SupervisedContention}
}
```

Figure 4:
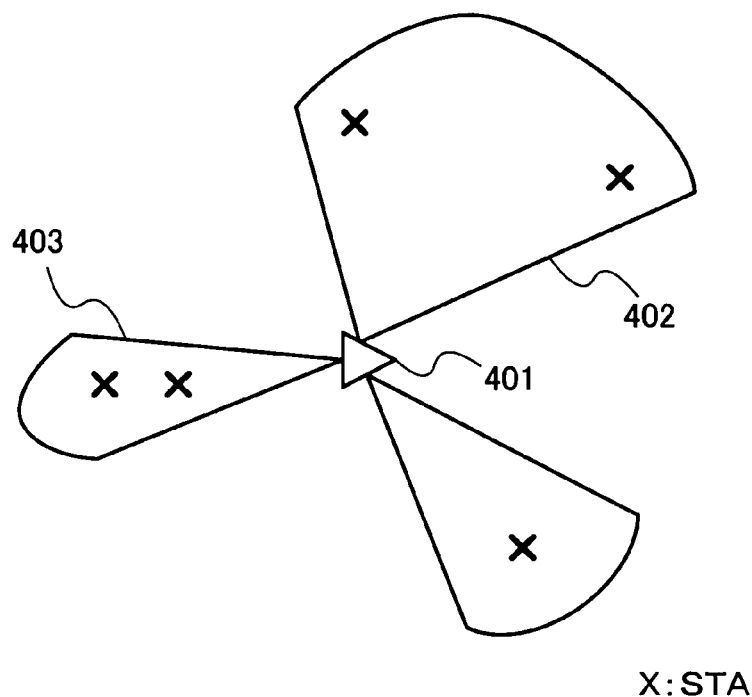
FIG. 4 is a drawing showing a dynamic beam forming AP that can dynamically create beams for grouping users according to spatial location.
Figure 5:
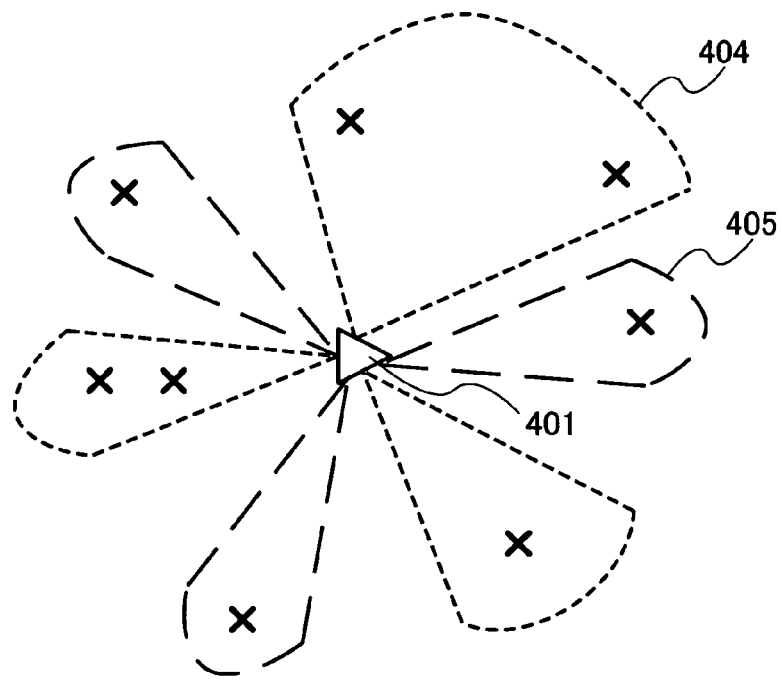
FIG. 5 is a drawing showing two groups of beams formed dynamically, these being two groups of beams formed by an AP in order to cover a plurality of users that cannot be covered by one group of beams (the reception range pattern can be optimized based on the users and amount of traffic)

An SDMA compatible WLAN may have APs equipped with different antenna functions. In a particular system, it is possible to select a combination of different beams from an array weighting coefficient library in order to optimize the reception range (coverage) for a user's spatial location. FIG. 4 shows an example of a system that is capable of forming three simultaneous beams (that is to say, that has three transceivers). In FIG. 4, an AP (401) covers space with low user/traffic density using a wide beam (402), and covers space with high user/traffic density using a narrow beam (403). The aim of the AP in so doing is to minimize the variance of traffic volume/operation rates among users of different groups and beams, and maintain the same kind of traffic/utilization pattern in all group beams. When it is not possible to cover all users simultaneously using different beams, and when attempting to achieve a balance of number of users and traffic for different beams simultaneously, the AP categorizes users into two beam groups and performs radiation of the two groups alternately. An example of two groups (404 and 405) among three non-overlapping beams is shown in FIG. 5. Reference code 404 indicates a group A beam, and reference code 405 indicates a group B beam. Based on the above case, a similar case in which beams overlap will be assumed.

In a system such as that shown in FIG. 4, the AP may not be able to cover all user space with those beams. Therefore, it is necessary to revert to unsupervised access mode periodically in order to detect the presence of a new station and enable its association. A new station detects a beacon and issues an Association Request in unsupervised access mode (that is, when the AP is in omni-directional mode). An Association Request may have the above-described structure with blank settings for the group ID and beam ID fields. Therefore, when the AP decides to accept a station, it can respond with an Association Response with the group and beam ID set to 0. A group/beam ID can be assigned to a station using a group ID assignment (Group-ID Assign) frame as described later herein.

Figure 6:
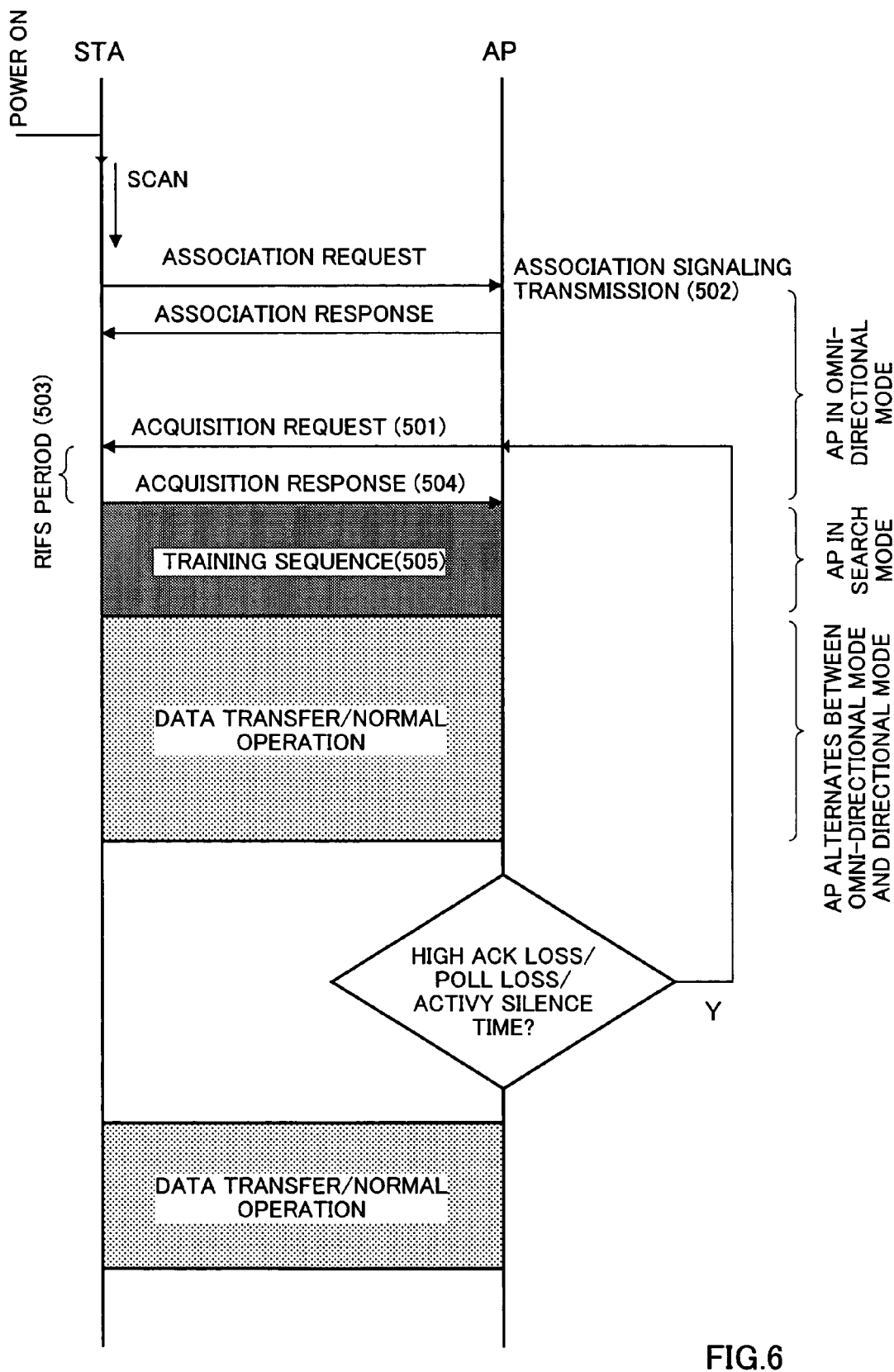
FIG. 6 is a drawing showing a message sequence that acquires a station using a training sequence command, this being a sequence of messages exchanged after association in order to specify the direction of a station and to reacquire a station after a long period of inactivity, a major response failure, or a polling frame (as explained in the text, such signaling is necessary according to receiver installation, and in particular beam selection by a dynamic beam forming AP (FIG. 3))

Beam forming for a system such as shown in FIG. 4 depends on knowledge of users' locations/directions by the AP. A method and apparatus are described below that enable the AP to acquire the relative direction of an STA by means of the message transmission shown in FIG. 6. After completion of association signaling transmission (502), the AP transmits to the STA an Acquisition Request command (501) containing information written using the above-described structure. After an RIFS period (503), the station responds with an Acquisition Response (504) comprising a predetermined training sequence (505) transmitted in a certain period (as indicated by a field in the frame). The training sequence period depends on the implementation of the AP—that is, the number of beams, beam switching speed, and receiver lock time. As stated above, the acquisition time depends on the system implementation. Therefore, depending on the system, it may be possible to identify the direction by using an inbound frame preamble as a training sequence, and avoid the need for the training sequence in FIG. 6.

Depending on the system implementation, the direction may (need to) be identified with different precision by the AP. One method is for the AP to switch between various available beams at the time of training sequence transmission. A user's direction is determined by the beam in which the user's transmission is received with the maximum signal strength (after normalization of differences in the power gain of different beams).

Figure 7:
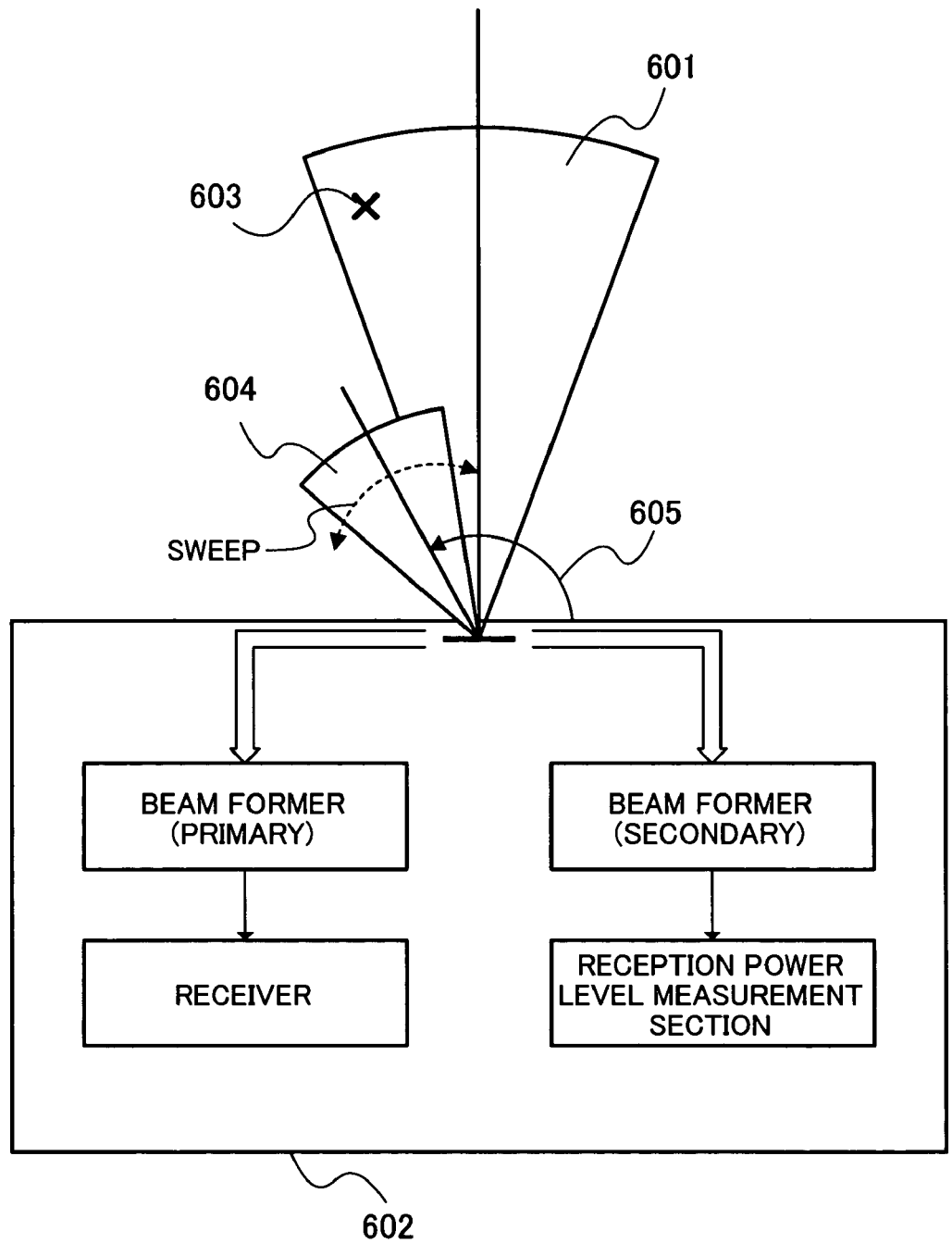
FIG. 7 is a drawing showing an apparatus incorporated in an AP for constant user location updating, this being a method of dynamically updating an AP user's location when there is packet transmission from a station to the AP using two simultaneously formed beams comprising a primary beam for packet reception and a secondary beam for location updating.
Figure 8:
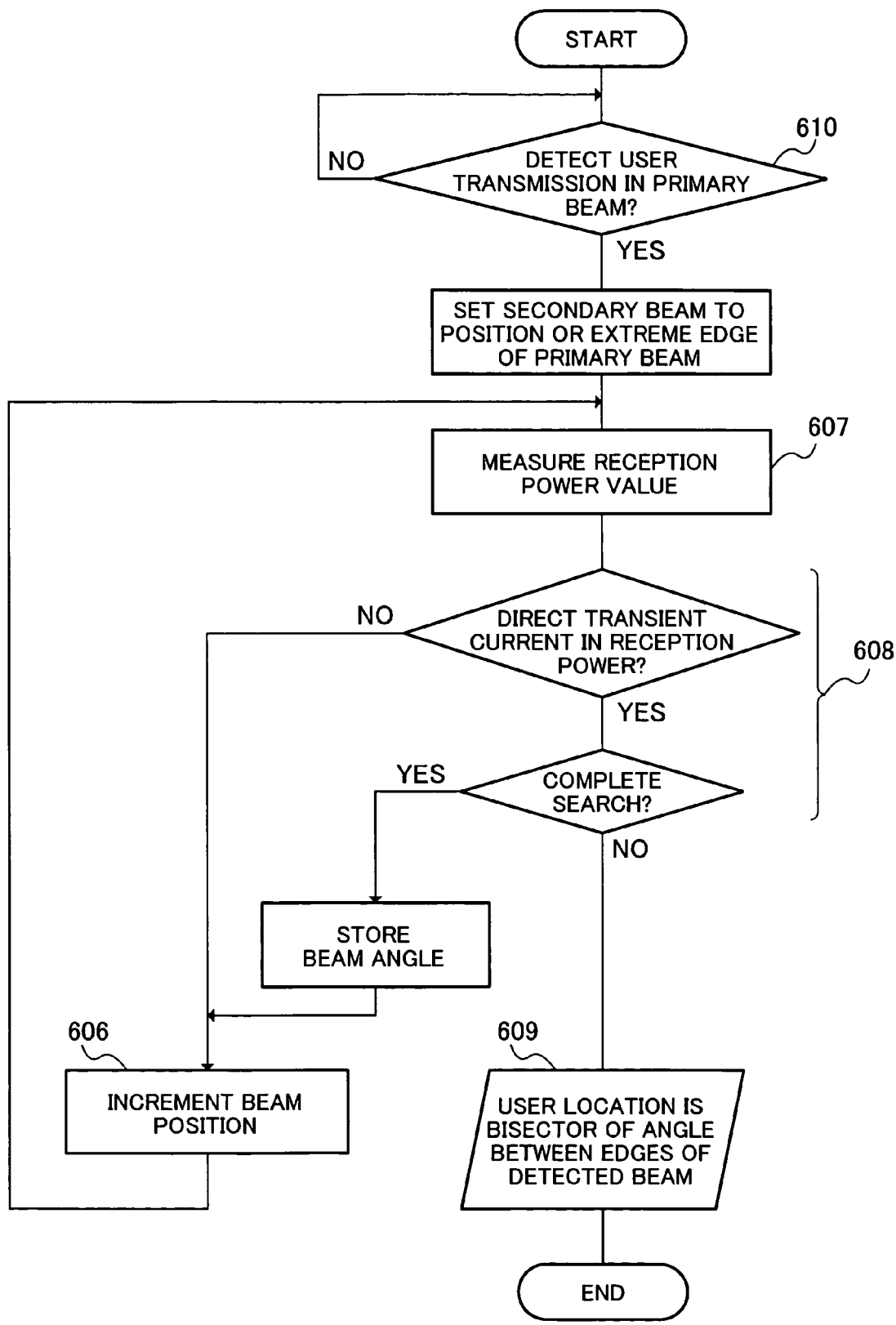
FIG. 8 is a flowchart showing the method of identifying a user's location, comprising steps in which the AP uses the apparatus in FIG. 7 to identify a user's location.

Ideally, beams formed by an AP should minimize gain fluctuations within the desired beam width, and therefore roll-off must have an extremely acute "sector shape." An advantage of such design is that beams transmitting different transmit signals can be arranged adjacent to each other, but a disadvantage is that a user is lost track of abruptly when moving from one beam to another. The message transmission technique shown in FIG. 6 solves this problem. However, the system must revert to unsupervised access mode in order to implement this, incurring a substantial overhead. FIG. 7 shows an apparatus that updates STA locations constantly with respect to an AP, and FIG. 8 shows the flowchart described below. While an AP (602) is receiving a packet from a target user (603) using a primary beam (601), a secondary beam (604) of similar sector-shaped design sweeps in the vicinity of the primary beam. If each sweep location is indicated by a beam angle (secondary beam central angle: 605), due to the beam shape a transient phenomenon (detected in (608)) occurs for the reception power level (measured in (607)) at two different locations—that is, at the beam edges. The AP can confirm the bisector of the angle enclosed by the two beam locations at which a transient phenomenon next occurs as the user's location. This localization can be executed at the time of inbound transmission and at the time of response frame reception by the AP (610). By executing this kind of dynamic user location updating, it is possible to adjust the beam pattern when necessary, perform appropriate STA reassignment to a different group using Group-ID Assign when necessary, and reduce the use of Acquisition Request signaling, thereby making efficient medium utilization possible.

Introducing a transient reception power detector as shown in (608) establishes an antinomic relationship between the detection time and reception range precision. Also, in transient phenomenon detection, it is considered appropriate to take account of interference received from a beam adjacent to the detector and/or channel information. With the algorithm shown in FIG. 8 it is possible to exit the loop and end at the station location by accurate identification of reception power by means of a simple method as shown in (608).

When users' locations are identified, if all users cannot be covered simultaneously, the AP can split users into groups according to users' spatial locations, traffic volume, and the number of beams that the AP can form simultaneously. Similarly, a suitable group and beam ID are assigned to individual stations. Even when the kind of continuous updating mechanism shown in FIG. 7 is used, there is a possibility of an STA leaving a beam space without being detected by the AP. The probability of this happening is particularly high in the case of an STA whose uplink traffic frequency is extremely low. Such cases can be detected by a polling failure or the form of the response from the STA. The AP attempts STA acquisition by issuing a new Group-ID Assign in a beam adjacent to the STA's original beam. In the worst case, it is necessary for the AP to issue a new Acquisition Request. In the case of an STA, leaving a beam space means that the STA is no longer able to detect a Beam Start Beacon or Beam End Beacon of the group to which it belongs. In such a case, it is necessary for the station to discontinue all power-saving operations and detect a new Group-ID Assign or Acquisition Request. When the AP reacquires the station and again establishes synchronization with the Beam Start Beacon and Beam End Beacon, the STA reenters the power-saving state and enters a sleep state in other group periods.

Figure 9:
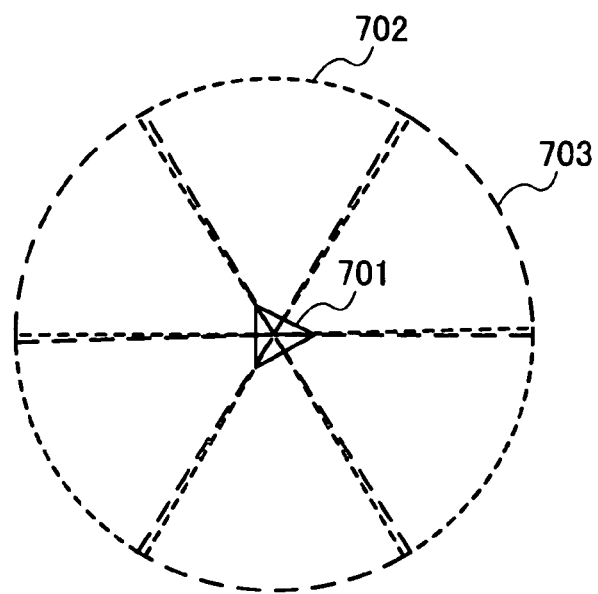
FIG. 9 is a drawing showing a fixed beam AP that can form two groups of beams comprising three beams that together cover all space.
Figure 10:
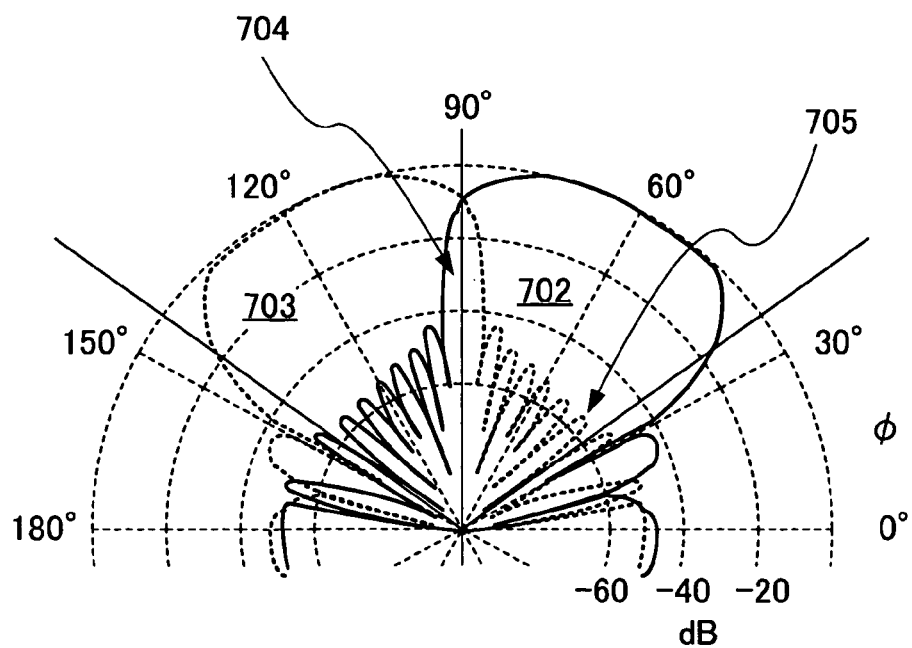
FIG. 10 is a drawing showing an actual beam pattern of two adjacent sector-shaped beams, illustrating the overlapping that occurs when an attempt is made to cover completely two adjacent beams due to the fact that a beam with a transition width of zero (vertical roll-off) requires countless antenna elements, and also showing interference generated by side lobes from one beam space to another beam space.

Another AP multi-beam antenna system that uses fixed beams to cover all space will be considered. An example of such a system is shown in FIG. 9. Here, an AP (701) uses two groups of beams (702 and 703) each having three beams in order to cover all space. Reference code 702 indicates a group A beam, and reference code 703 indicates a group B beam. As stated above, a desirable characteristic of a multi-beam system is "sector-shaped" beams—that is, beams that have uniform passband gain and extremely sharp roll-off. However, in actuality it is impossible to achieve extremely sharp roll-off, and a certain amount of overlap (704) occurs between adjacent beams as shown in FIG. 10. Reference code 705 indicates side lobe interference on a group A beam from a group B beam. In this kind of case, it is obvious that there must be at least two beam groups arranged so that beams of alternate groups are adjacent. In the system shown in FIG. 9, direction-of-arrival detection is simplified by simply switching between the two groups to identify a beam in which a user is present. The AP can direct respective assigned user beams and groups to be identified using a beam ID and group ID in the Association Response phase utilizing the preamble of an Association Request. Due to overlapping between adjacent beams, two cases can be envisaged: (1) a case in which a station is in a non-overlap area and therefore receives radiation of only one beam, and (2) a case in which a station is in an overlap area. A station located in an overlap area is assigned to one group or the other. It is also possible for the station to request this (by using the GroupID and BeamID fields of an Association-Request frame), and whether or not a determination based on a load/traffic balance algorithm executed by the AP to minimize utilized band variance between different beams of different groups is accepted depends on the AP.

Unlike a dynamic beam system that optimizes beam coverage according to user location and traffic volume, a fixed beam system uses beams that cover all space. Therefore, a station that performs a medium scan after being powered on detects a Beam Start Beacon of either one group or two groups according to whether the station is in a non-overlap area or an overlap area. When in a non-overlap area, a station can determine the BeamID and GroupID by means of a detected Beam Start Beacon and Beam End Beacon. The station can include this information in association signaling executed between supervised contention periods of inbound transmission of that beam. When in an overlap area, it can be shown that a station can start an Association Request between supervised contention access periods of either group and detection is possible for both groups. In a downlink period, the AP responds with an Association Response, and can accept association of that station with the group desired by the station, or embed information directing association with a different group (with respect to elements determined by the AP such as load/traffic volume).

It is highly probable that an STA will move as time passes and will enter the reception area of another beam/group. The AP detects this from a polling failure or the form of the response from the station. The action in response to this is to transmit a new GroupID or implement polling with a beam adjacent to the original beam. In the worst case, it is necessary to issue a new Acquisition Request. A station that moves from a beam of one group to a beam of another group is no longer able to detect a Beam Start Beacon or Beam End Beacon of the original group to which it belonged at the scheduled time. In this case, the station must discontinue all power-saving operations and detect a new Group-ID Assign sent in the period of the adjacent group. When the station acquires the new group ID and establishes synchronization with the Beam Start and Beam End Beacons, the station reenters the power-saving state and enters the sleep state during other group periods.

A WLAN equipped with a multi-beam compatible antenna that can cover all space based on the above description need not use an unsupervised access period for which generation is repeated regularly. However, when a conventional station is detected, the necessity of reverting to unsupervised access mode arises. In the case of a dynamic beam forming system, a regular unsupervised access period is necessary to enable detection and association of a new station not present in a beam space initially covered by the AP. There is consequently an antinomic relationship between the two systems. That is to say, a dynamic beam forming system covers only areas in which users are present, and therefore makes more efficient use of all beams in a supervised access period, and needs an unsupervised period to detect a new station, while a fixed beam system covers space uniformly regardless of user locations, and need only revert to unsupervised access mode when a conventional station is detected.

Figure 11:
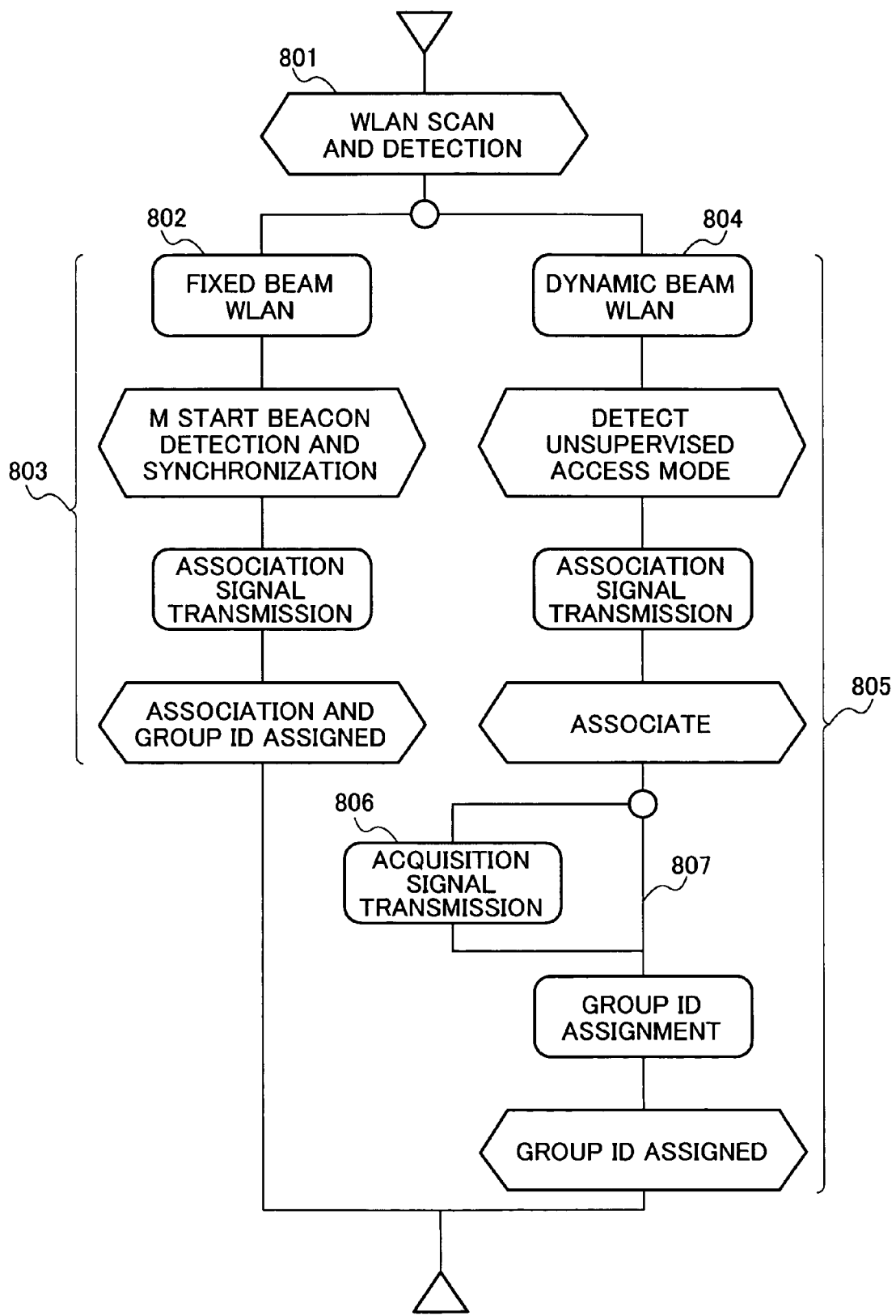
FIG. 11 is a drawing showing a station startup sequence HMSC, summarizing startup sequences used by a station.

FIG. 11 is an HMSC description of the startup sequences used by a station for the above-described two different antenna systems (dynamic beam forming and fixed beam types). Reference code 801 indicates a scan and detection phase in which the station detects WLAN contents. In the case of a fixed beam system (802), the station goes through the above-described association and group assignment steps by following the message path indicated by reference code 803. In the case of a dynamic beam system (804), the station follows the steps indicated by reference code 805. As can be seen from the figure, the location of the station is obtained by using the systematized training sequence shown in FIG. 6 and indicated by reference code 806, or by using a frame transmission preamble as indicated by the message path (807).

Figure 12:
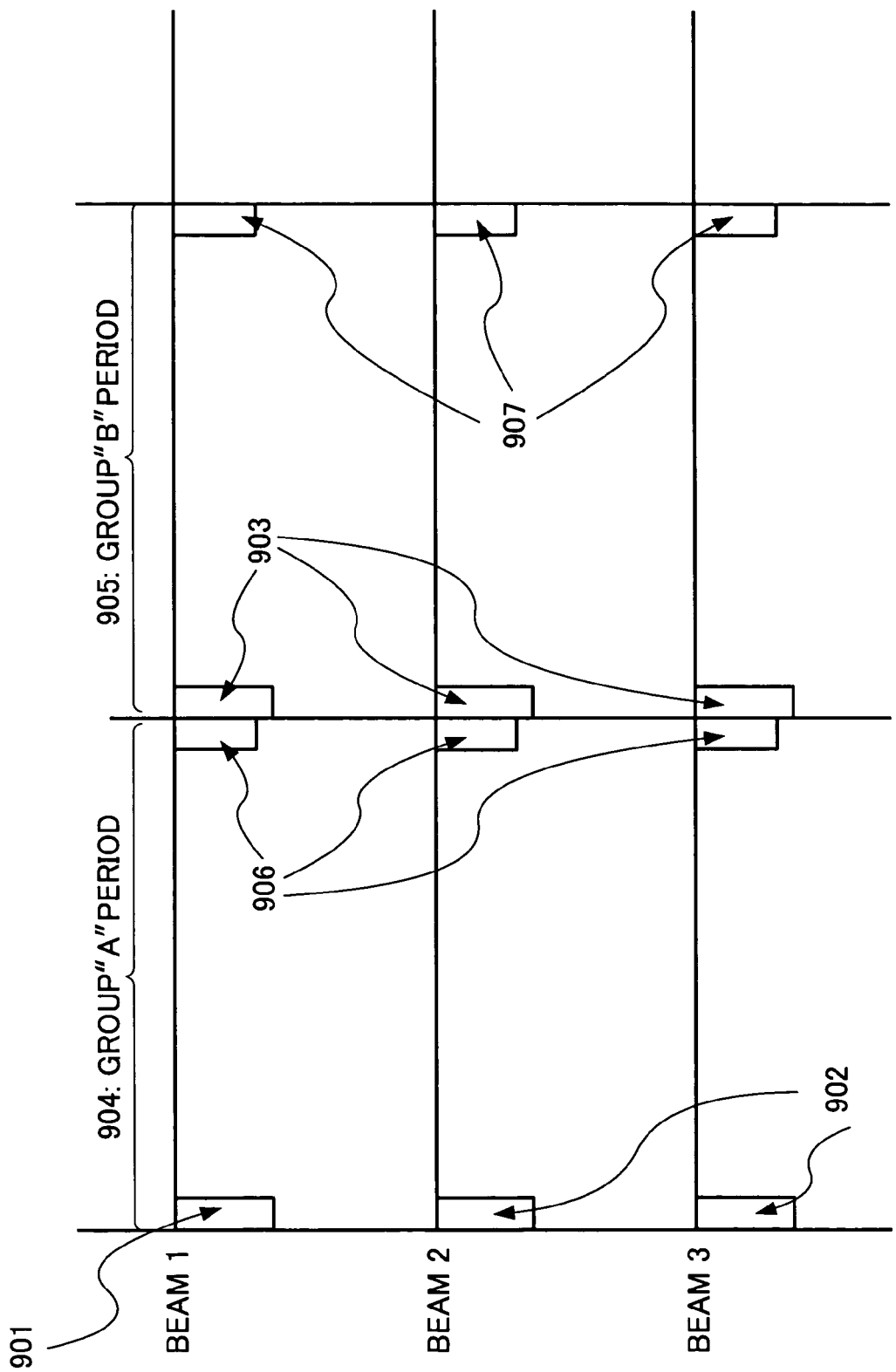
FIG. 12 is a drawing showing an example of the supervised access mode timing structure, this being the supervised access mode timing structure based on a system comprising two beam groups of three beams each (time being divided between the two groups, and the start and end thereof being indicated by beam start and beam end beacons respectively)

FIG. 12 shows the timing structure of superframe supervised access periods, based on the example of two groups each having three beams. Reference code 901 indicates a Beam Start Beacon frame broadcast by the AP in beam 1 of group "A." Similarly, the Beam Start Beacons corresponding to beams 2 and 3 of group "A" are together indicated by reference code 902, while reference code 903 indicates all the Beam Start Beacons of group "B." Each Beam Start Beacon reports the start of operation to users of a specific group of a specific beam, and reports the timing of the next group to users of a supervised access period unique to that group (GroupDuration) and the current group (GroupRepetitionRate). In this structure, this is represented by a speed unit parameter, but it should be noted that this can also be represented by a time unit parameter. In a group "A" period (904), group "B" users must stop activities and select power-saving. Conversely, in a group "B" period (905), group "A" users must stop activities and select power-saving. Alternative mechanisms that can be used together with the above are having the AP broadcast a Beam End Beacon and notifying stations of a specific group that a medium is not to be accessed, or giving notification that power-saving is to be executed until the next group period or unsupervised access period. Beam End Beacons corresponding to groups "A" and "B" are indicated by reference code 906 and reference code 907 respectively. FIG. 12 shows a concept of time division within supervised access mode using two group periods, one for each group. However, this does not exclude the more usual case of a number of alternately occurring group periods in the same supervised access period.

DownlinkScheduleElement contained in a Beam Start Beacon is a structure that includes medium assignment/polling for outbound transmission of various associated STAs. To facilitate further subdivision of power-saving—that is to say, for power-saving for a station for which reception of outbound transmission is not scheduled—DownlinkScheduleElement can report the end timing of an outbound transmission phase or start timing of a Poll+Supervised Contention Announcement frame used to start an uplink phase described in a following section of this embodiment.

Figure 13:
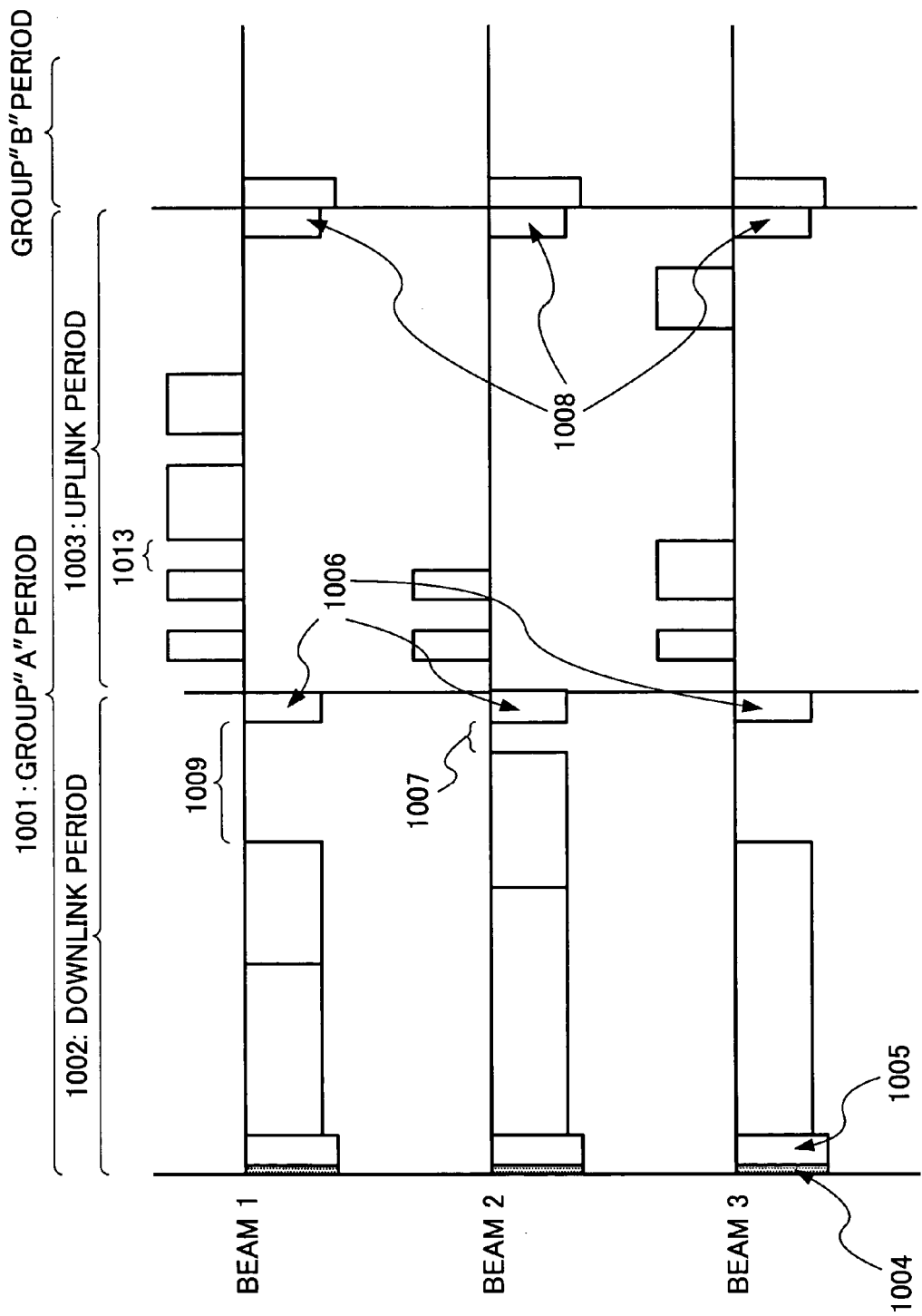
FIG. 13 is a drawing showing an example of supervised access mode for one group, being the supervised access mode inbound and outbound transmission structures (in this example, a group period is divided into one uplink phase and one downlink phase; the drawing shows synchronization with the AP between inbound and outbound transmission by means of different beams)

To avoid collisions with other beams (due to the assumption that each station uses an omni-directional antenna) and collisions caused by the AP itself (due to imperfect isolation in the actual design of RF components) synchronization of transmit/receive operations must be constantly maintained by the AP for all beams. Based on the example in FIG. 12, FIG. 13 shows details of a supervised access period group "A" period (1001). The separation of downlink and uplink phases in transmission and the synchronization of these in the beams are indicated by reference code 1002 and reference code 1003 respectively. To simplify the diagram and explanation, FIG. 13 shows a group "A" period divided into an uplink phase and downlink phase. However, this does not exclude a case in which a plurality of uplink and downlink phases occur within a group period.

In order to achieve efficient band utilization, downlink frames (that is, frames whose origin is the AP) of a specific beam can be aggregated. This facilitates the elimination of frame intervals of frames conventionally used to differentiate between two independent transmissions (outbound transmissions are not completely independent as they have the AP as their origin). As a result of this frame interval elimination, a single common preamble (1004) is sufficient at the start of the frame, and the band used can be further reduced. All receivers synchronize with this common preamble, and can interpret and access the relevant part of an outbound transmission depending on the MAC layer. As shown in the figure, outbound transmissions share the same source (the AP), enabling further aggregation with Beam Start Beacons. As explained above, a Beam Start Beacon (1005) contains information as to which stations receive data in outbound transmission, and if a station not included in this list accepts this information it may enter the power-saving state in the downlink phase.

On completion of outbound transmission in all beams in a specific group, the AP performs uplink request/polling issuance. This can be issued in aggregated form in the longest outbound transmission in a group (in the example in FIG. 13, beam 2). However, when this kind of aggregation is executed, the use of power-saving between stations belonging to an unscheduled beam or group is excluded. This is because a station loses synchronization with an outbound transmission if power-saving is executed. FIG. 13 shows Poll+Supervised Contention Announcement frames (1006) synchronized in all beams transmitted after 1 RIFS (1007) of the longest outbound transmission. This is to enable a station in downlink power-saving mode to reestablish synchronization with the AP in order to receive a Poll+Supervised Contention Announcement frame.

As shown in the above-described structure, a Poll+Supervised Contention Announcement frame (1006) reports an inbound transmission schedule that the AP wishes to receive from a station of a specific beam. The fields of the above structure are actual structures indicating details of permission/polling for a specific station (AddressSTA). GrantTime indicates the scheduled time at which the target station is to start that transmission, and GrantDuration indicates the time or period for which the STA is permitted to access a medium. Using the GrantType field, the AP indicates an intention of polling—that is, a request for a response to a reservation request or a confirmation response to a downlink frame or the like transmitted in the past- to the STA. The last element of a Poll+Supervised Contention Announcement frame reports the start of a supervised contention access period to all users of a predetermined group and beam. It should be noted that contention based traffic is only acknowledged in the next downlink period. It is necessary for all uplink accesses to channels to end 1 RIFS before the Beam End Beacon frame (1008), and for the AP to be able to perform medium control again.

The AP must embed many polls in Poll+Supervised Contention Announcement frames (1006), and permit contention based transmission of uplink packets of different lengths in difference beams. When the AP executes sequential polling, it is necessary to establish synchronization with media or acquire media of all beams before a polling frame (downlink transmission) is transmitted. This results in unnecessary band loss especially when the packet sizes of different beams differ greatly. Also, as there are no assumptions whatever concerning station antenna functions, in the case of an omni-directional inbound transmission from an arbitrary station it is not possible to observe whether a medium is vacant for another station, and transmission cannot be performed as a result of conventional carrier sensing technology. Therefore, when polled uplink access is performed, it is necessary for a polled station to depend on timing information included in the polling, and ignore a conventional carrier sensing mechanism. However, when power control between stations (described later herein) is extremely good, a conventional carrier sensing mechanism can detect a vacant medium (actually when there are consecutive transmissions). In such a case, occurrence is predicted only for users of groups in sufficiently separated beams—that is, it is assumed that two stations of a particular beam will be mutually hidden.

As the AP uses a directional antenna, it can receive two spatially separated inbound transmissions. Therefore, multi-beam antenna MAC also contributes to improved throughput in a supervised contention access period.

It must be noted that, in order for the AP's receiver to achieve synchronization with the next transmission from a station, a gap is necessary between two consecutive inbound transmissions. This "guard time" (indicated by reference code 1013 in FIG. 13) is necessary to prevent a collision between two scheduled transmissions due to drift or inaccuracy of the local clocks. A guard time must be inserted so that the actual time interval between two consecutive transmissions does not exceed the CIFS period and is longer than the RIFS period.

Figure 14:
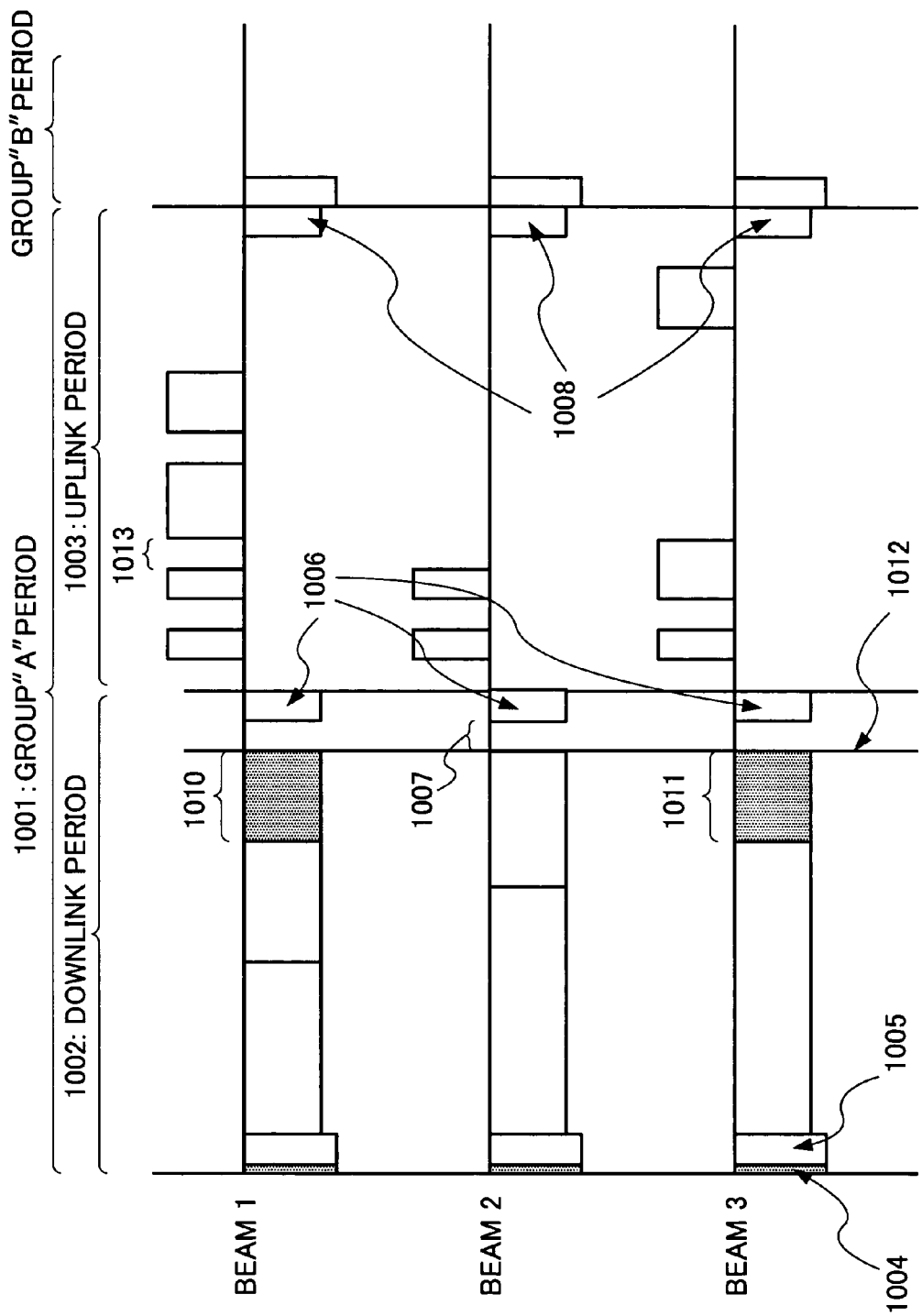
FIG. 14 is a drawing showing supervised access mode inbound and outbound transmission structures (including dummy/pad transmission). (This drawing is an expansion of the example shown in FIG. 12, and shows a method in which dummy/pad transmission is used to prevent medium access by a rogue station by synchronizing all beam transmission times in the downlink phase).

It can be seen that there is a possibility of variation in the outbound transmission times of different beams in the downlink period (1002) in FIG. 13. This occurs due to the existence of different traffic volumes for different spatially separated users. As transmissions from the AP have intrinsic directivity, only one user group "detects" these transmissions at a particular time, as explained earlier. In the example in FIG. 13, this is group "A." According to the above-described protocol, group "B" users do not perform transmission during this period. However, if there is a rogue station (which may also be a conventional contention based access WLAN station) within the reception range of beam 1 of group "A," there is a possibility of the rogue station detecting the medium vacant time indicated by reference code 1009. To reduce the possibility of a collision (and thereby improve WLAN throughput), the AP can use a mechanism that transmits dummy/pad data to coordinate beam 2 and the transmission time. An example of this is shown in FIG. 14. Here, reference codes 1010 and 1011 indicate beam 1 and beam 3 dummy/pad data transmissions, whose purpose is to coordinate with beam 2 (1012) and prevent a rogue station sharing that beam from attempting contention based access in the downlink phase. Reference code 1012 indicates that, as a result, beam 1 and beam 3 downlinks and beam 2 are coordinated. This mechanism prevents access to a medium by a rogue station in the currently active group (in this example, group "A") and reduces the possibility of a collision, but cannot handle a case in which a rogue station in group "B" transmits in a group "A" period. The AP cannot avoid such a case, but can detect it by checking confirmation responses received in the uplink phase. If confirmation responses indicating denial are received for all frames outbound-transmitted simultaneously in different beams, the most probable cause is a rogue station. The AP can take appropriate action such as switching to unsupervised access mode, detecting the rogue station, and also requesting that station to transfer to another channel.

A station polled for a confirmation response in a Poll+ Supervised Contention Announcement period in an uplink must respond with a confirmation response frame indicating denial if the received downlink data contains an error. In other words, the station should transmit both a confirmation response indicating denial and a confirmation response indicating affirmation. By this means, the supervised access period timing structure is changed due to frame loss, and it is possible to avoid a "medium silent interval" longer than the guard time (shorter than a CIFS and longer than an RIFS), and by extension to avoid medium access by a contention based rogue station. The same kind of approach can also be applied to polling object band assignment. A station should continue transmission during an assigned period even if there is no data to transmit.

For transmission of a stream requiring a stable QoS level, it is assumed that the AP provides a service (systematic polling) that satisfies requirements for a specific band and delay specified by a station in the reservation request phase. The AP may also refuse a reservation request depending on the utilization situation of that band. With a conventional WLAN (that is to say, a conventional system that does not use a multi-beam antenna), a medium is simultaneously shared by all stations. Therefore, from the standpoint of band reservation, the AP need only track one (omni-directional) beam. With a multi-beam antenna WLAN, space (together with users therein) is divided among multiple beams. Therefore, the AP can easily perform reservation of one of these beams by means of a reservation request made by a station in that beam. The stream receiving side may be in a different beam accessed by the AP or another network. Therefore, a multi-beam antenna WLAN requires a reservation request that contains the transmission destination address of the stream making the reservation. Based on this information, the AP identifies the location of the transmission destination station/traffic receiving side. If the receiving side is the WLAN itself, the AP must ensure the availability of appropriate resources that can be used on both an uplink and downlink before accepting the reservation request.

Depending on the use of a multi-beam antenna system (depending on the direction and beam pattern), a variable gain element is added to link estimation. Use of this gain enables the transmission requirements of stations or the access point to be reduced, and enables battery savings to be achieved and interference with other users of the same channel to be suppressed. Transmission power is adjusted at the same order of a speed as the response time for one packet in packet units. As a WLAN uses time division duplex communication (TDD), the same channel is used on an uplink and downlink, and measurements performed on one link can also be applied to the reverse link. The following mechanism for implementing power control will now be described. A station (or AP) transmitting a packet to an AP (or station) includes a transmission power level used in a frame. This is coded by the payload (interpreted by the receiving-side MAC sublayer) or physical convergence sublayer (containing the data transfer rate, scrambler information, and so forth). The receiver of the originally transmitted frame compares the power actually received (determined by measuring the received signal strength) and the actual power level used in transmission (coded in the transmit frame), and determines the excess power used in transmission. Thus the station can reduce the transmission power by this excess amount in the next transmission, and net power consumption and interference with other users of the same channel are decreased.

As described above, the characteristics of the present invention can be summarized as follows.

(1) A medium access control method and system in a wireless network that improve the total throughput of the network, comprising: (i) an access point (AP) equipped with an SDMA compatible multi-beam antenna and a plurality of transceivers such that individual transceivers are simultaneously connected to different antenna beams; and (ii) one or more stations scattered in the reception space of a wireless LAN.

(2) A timing structure applied to the system described in (1) above, comprising: (i) a periodically transmitted beacon frame that reports the existence of a wireless network and provides a timing reference to each station on the network; (ii) a "supervised access mode" that is a period in which the AP effectively improves network throughput by controlling access to a wireless channel and adjusting transmission with users so that the antenna characteristics are utilized and a plurality of simultaneous transmissions can be implemented on the same channel; (iii) an "unsupervised access mode" that is a period in which the AP antenna is configured in a omni-directional pattern, and each station accesses a channel freely so as to be able to perform transmission using conventional carrier sensing technology; and (iv) signal transmission signaling whereby the AP starts or terminates a supervised or unsupervised access period.

(3) A protocol stack that implements the method and system described in (1) above, comprising: (i) a medium access control (MAC) layer that has a role of defining access rules whereby a plurality of wireless stations access a common medium; (ii) a physical layer that has a role of performing actual data transmission and reception on a wireless channel; and (iii) a management entity that manages and adjusts operation of the layers described in (i) and (ii) in order to improve overall wireless network throughput.

(4) The medium access control (MAC) layer described in (i) of the protocol stack described in (3) above and the system described in (1) above, comprising: (i) a contention based access mechanism whereby a carrier sensing mechanism is used and stations compete for a transmission medium based on one set of rules; (ii) a polling based channel access mechanism whereby the AP can satisfy a band request of a specific station while maintaining a service quality level specified beforehand by that station; and (iii) a beam access coordinator that implements high-throughput by adjusting data transfer between antennas and the access point and utilizing the function of the multi-beam antenna using the medium access mechanisms described in (i) and (ii).

(5) The beacon frame described in (i) of (2) above that is broadcast by the AP and reports the existence of a WLAN and provides a timing reference to stations scattered on the network, containing: (i) an identifier unique to the wireless network whereby each station can uniquely and explicitly identify an AP and therefore a specific network; (ii) wireless network function and protocol related information specially defined by the implementation of an access point; (iii) information describing the used frequency of a beacon broadcast by an access point on this wireless network; and (iv) a period in which the wireless network operates in supervised access mode, and whereby a conventional station does not execute association or transmission in that superframe period, as a result of which effects on wireless network throughput due to such transmissions/collisions are minimized.

(6) Information that describes the function and protocol of each station (or the AP) described in (ii) of (5) above, comprising: (i) a protocol reference number that enables the type of station medium access control protocol to be confirmed; (ii) the antenna type and pattern; (iii) antenna switching/operating functions; and (iv) station direction finding/positioning functions.

(7) An Association Request frame that is transmitted from a station wishing to associate with a specific wireless network, contains arbitrarily the information elements described in (i), (iv), and (v), and the information elements described in (ii) and (iii) according to the network configuration and station function, and reduces signaling overhead, containing: (i) the wireless network identifier described in (i) of (5) above received in a beacon frame for notifying the AP that the station wishes to associate with the WLAN; (ii) a group identifier of a beam group that includes the station in its range and for which that station desires association, determined by the station by detecting the presence or absence of the "Beam Start Beacon" and "Beam End Beacon" described respectively in (11) and (12) below; (iii) a beam identifier of a specific beam that includes the station in its range and for which that station desires association, determined by the station by detecting the presence or absence of the "Beam Start Beacon" and "Beam EndBeacon" described respectively in (11) and (12) below; (iv) the address of the station itself enabling unique identification by the AP in the next communication; and (v) information relating to the characteristics and functions of the protocol described in (6) above implemented by the station, that determines the possibility or otherwise of association with the AP, and determines the method of providing the best service to that station when association is accepted.

(8) An Association Response frame request that is transmitted by an access point in response to the Association Request frame described in (7) above, accepts or denies a station request, and contains arbitrarily the information elements described in (i), (iv), and (v), and the information elements described in (ii) and (iii) according to the network configuration, AP and station functions, and the structure of the transmitted Association Request, containing: (i) the wireless network identifier described in (i) of (5) above for acknowledging and responding to the Association Request described in (7) above created by a station; (ii) a group identifier of a beam group used by the AP for communication with that station; (iii) a beam identifier of a beam used by the AP for communication with that station; (iv) the address of the station itself that is the Association Response transmission destination; and (v) information relating to the request status (that is, success or failure) and characteristics and functions supported by the AP.

(9) An Acquisition Request whereby an AP requests transmission of a predetermined training sequence to a station for a certain period, and the AP identifies the spatial location of that station with respect to the AP using this transmission, containing: (i) the address of the station that makes the Acquisition Request; (ii) the address of the station that is the Acquisition Request transmission destination; and (iii) the transmission period or length of the training sequence requested in order to transmit an address to the specified station.

(10) A Group-ID Assign frame that performs assignment to a specific beam group for further transmit/receive operations and is transmitted to a station by an AP, containing: (i) the AP address/WLAN ID; (ii) the address of the station that is the transmission destination of the Group-ID Assign frame; (iii) a group ID determined by the AP and assigned to the station whose address was specified; and (iv) a beam identifier of a beam used by the AP in the next communication with the station whose address was specified.

(11) A Beam Start Beacon frame that is broadcast from an AP to stations of a specific beam and group, and indicates the start of operation to users of that beam group, containing: (i) an AP address/WLAN ID enabling identification of the transmission source for each station; (ii) information relating to the functions and protocol of the wireless network described in (6) above; (iii) the group ID of the aforementioned beam; (iv) the beam ID of the aforementioned beam; (v) the period in which the aforementioned group is active—that is, the period in which the AP performs transmission/reception with users of the aforementioned group before switching to a different pattern in order to handle users of another group; (vi) the frequency for transmitting a Beam Start Beacon that makes it possible for stations of the aforementioned group and beam to achieve mutual synchronization; and (vii) a schedule of outbound transmissions created by the AP in the current group period.

(12) A Beam End Beacon that is broadcast by an AP to stations of a specific beam and group, and indicates termination of operation to that set of users, containing: (i) an AP address/WLAN ID enabling identification of the transmission source for each station; (ii) information relating to the functions and protocol of the wireless network described in (6) above; (iii) the group ID of the aforementioned beam; (iv) the beam ID of the aforementioned beam; and (v) the period in which the aforementioned group is inactive, and the aforementioned users can adopt an operating mode that facilitates a reduction in power consumption.

(13) A Poll+Supervised Contention Announcement frame that is transmitted by an AP to stations of a specific beam, and defines a wireless medium polling based medium access and contention based access schedule, containing: (i) a polling list assigned to respective stations; and (ii) an information element that declares a medium for uplink contention based access use of a specified period known as a supervised contention access period.

(14) The polling list assigned to stations described in (i) of (13) above, containing: (i) the address of a station for which polling based access is permitted; (ii) the polling time—that is, the time when a station can start transmission; (iii) the polling period—that is, the period for which a station can execute transmission; and (iv) the purpose of polling or permission for indicating to a station that polling is for a stream that requested a band beforehand, or to request reception confirmation for a downlink frame or the like transmitted in the past.

(15) An AP that uses an SDMA compatible antenna capable of forming a "sector-shaped" beam, characterized by: (i) comparatively stable gain in the passband that minimizes fluctuation of the reception power level for a user belonging to that beam; and (ii) sharp roll-off—that is, a narrow transition width—such that a beam is generated at short intervals by the AP by suppressing the occurrence of interference due to transmission from a particular beam to a user of a different beam, spectral efficiency is increased, and consequently high-throughput is obtained.

(16) A WLAN system that uses the AP described in (15) above that is equipped with a multi-beam antenna and is capable of generating a beam dynamically, having functions of: (i) optimizing the reception range pattern for the spatial locations of individual users and their respective traffic loads; and (ii) minimizing traffic variance/utilization rate variance among different users of a group or beam by grouping users according to spatial location.

(17) The WLAN system described in (16) above that uses the timing structure described in (2) above, comprising: (i) the beacon frame described in (5) above that is transmitted periodically using an omni-directional beam pattern so as to provide reception range/detection to a new station present in an area that does not correspond to the existing antenna pattern described in (i) of (16) above; (ii) a periodically repeated unsupervised access period that can be estimated by a new station from the broadcast beacon described in (5) above, for facilitating detection and association of a new station that is not present in the reception range of an existing antenna pattern used in a supervised access period; (iii) transmission of the Beam Start and Beam End Beacons described in (11) above and (12) above, executed in different beams of a group period, in order to perform a service that reports the start and end of the relevant group/beam period, and reports the beam and beam group ID to stations within the reception range; (iv) a station that is within the reception range of an existing beam that starts transmission of the association signaling described in (7) above and (8) above, called in the supervised contention access mode of the aforementioned beam described in (ii) of (27) below; (v) a station that is not within the reception range of an existing beam that starts transmission of the association signaling described in (7) above and (8) above during the unsupervised access period described in (ii); (vi) the station described in (iv) to which group and beam IDs are assigned using the information elements described in (ii) and (iii) of (8) above; (vii) the station described in (v) to which group and beam IDs are assigned using the frame described in (10) above; and (viii) an AP that can perform reassignment of a new group ID to a station at any time by means of the signaling described in (10) above.

(18) A method of identifying the group and beam IDs of a particular station as necessary in order to handle a case in which the function requested in (vii) of (17) above is implemented, a user moves, and as a result, the call in (viii) of (17) above is generated, comprising the steps of: (i) the AP transmitting the Acquisition Request frame described in (9) above to a station; (ii) the station responding to the request in (i) with a predetermined training sequence; (iii) the AP switching various beams that can be generated, and detecting the user's location as being in the direction of the beam in which the training sequence is received at the greatest strength (normalized for beams with different gain); and (iv) updating a user location after identifying the initial location of a station using the method and apparatus described in (19) below instead of (iii).

(19) A method and apparatus whereby an AP continually updates the location of a user in order to minimize use of the method in (18) above and overhead associated therewith by having the AP predict station mobility based on all inbound transmissions executed by a station, comprising the steps of: (i) using a primary beam that is static and has the characteristics described in (15) above, used to receive a transmission from a station; (ii) using a controllable secondary beam having the characteristics described in (15) above that sweeps the vicinity of the primary beam; (iii) identifying the angular location of the secondary beam for which a transient phenomenon exists in the reception power level; and (iv) giving the location of a station by bisecting an angle whose range is determined by the two beam locations in (iii) above.

(20) A WLAN system using the AP equipped with a multi-beam antenna described in (15) above, being able to cover all space with one set of fixed beams so that overlapping between adjacent beams is minimized, and having at least two group IDs.

(21) The WLAN system described in (20) above that uses a frame structure comprising only supervised access mode, and improves medium utilization, being characterized in that: (i) the Beam Start and Beam End Beacons described in (11) above and (12) above are transmitted respectively in beams of different group periods in order to perform a service that reports the start and end of the relevant group/beam period, and reports the beam and beam group ID to stations within the reception range; (ii) a station detects the group/beam ID of an area in which there is a station indicated to the AP by means of the association signaling described in (7) above and (8) above, called in the supervised contention access mode of the aforementioned group/beam described in (ii) of (27) below; (iii) the AP responds to the association signaling described in (ii) and assigns a group/beam ID to the station, and also, in the case of a station present in an overlap area between beams of two groups, optimizes traffic variance of users of different beams within a group; and (iv) the AP can perform reassignment of a new group ID to a station at any time using the signaling described in (10) above.

(22) A function that detects and handles station mobility, of the AP and each station of the WLAN system described in (16) above and (21) above, comprising the steps of: (i) the AP detecting station movement by observing consecutive polling failures or a confirmation response from a station; (ii) the AP transmitting a new Group-ID Assign to a station that has been lost track of using a beam adjacent to the original beam; (iii) the AP retransmitting the Acquisition Request signaling described in (18) above if station reacquisition is not possible by means of the method described in (18) above; and (iv) a station, in case of detecting the occurrence with high probability of polling failure or failure of a confirmation response from the AP and/or loss of a Beam Start or Beam End Beacon of the assigned group, discontinuing all power-saving operations, and the AP performing reacquisition of that station using steps (ii) and (iii).

(23) Period division by group of the supervised access period described in (ii) of (2) above, performed in order to facilitate power-saving operation of stations of a specific group until the next operation period, comprising the steps of: (i) reporting the start and end of a group operation period to users of the aforementioned group using the Beam Start and Beam End Beacons described in (11) above and (12) above; and (ii) performing synchronization of Beam Start and Beam End Beacon transmission for all beams of a specific group.

(24) Incorporation of a downlink schedule element of the Beam Start Beacon described in (vii) of (11) above, having as objects: (i) to show an outbound transmission schedule composed of a transmission destination address, transmission length, and time at which the aforementioned transmission is performed; and (ii) to show the end of an outbound transmission schedule—that is, the transmission time corresponding to the Poll+Supervised Contention Announcement frame described in (13) above—and enable a station that is not scheduled to receive an outbound transmission in the given group period to execute power-saving in the downlink period of that group period.

(25) Transmission aggregation and synchronization of transmissions by means of different beams in the same group are performed in order to avoid a collision with another beam due to imperfect separation of the actual RF components and a collision in the AP itself, wherein aggregation and synchronization are performed in: (i) a downlink phase composed of all outbound transmissions corresponding to the downlink schedule element described in (24) above, with stations of the aforementioned group as objects; and (ii) an uplink phase composed of transmissions performed from stations to the AP using both polling based access and contention based access mechanisms described respectively in (ii) and (iii) of (4) above.

(26) Aggregation of all outbound transmissions in the outbound transmission phase described in (i) of (25) using the Beam Start Beacon described in (vii) of (11) above, wherein unnecessary overhead is suppressed and medium utilization is improved by using the steps of: (i) using a common preamble transmitted by the AP for Beam Start Beacon use that enables all receivers to synchronize; and (ii) eliminating the frame interval between outbound frames.

(27) The start of an inbound transmission phase using a Poll+Supervised Contention Announcement in which are embedded all inbound polls described in (13) above, comprising, in order to minimize overhead due to individual polls and render unnecessary resynchronization for transmission of the individual polls described in (25) above: (i) a polling access phase in which stations transmit over a permission/polling period included in a Poll+Supervised Contention Announcement frame schedule; and (ii) a supervised contention phase permitted until scheduled transmission of a Beam End Beacon following a polling access phase.

(28) Use of a guard time that is a time between consecutive polling transmissions included in the schedule described in (14) above and (i) of (27) above, after handling of a local clock drift phenomenon of each station, provided in a period in which a medium is vacant longer than an RIFS and shorter than a CIFS.

(29) A method of minimizing collisions due to a rogue station that uses carrier sensing not in accordance with the protocol of the WLAN system described in (1) above, comprising the steps of: (i) transmitting "dummy" or "pad" data and equalizing transmission times in all beams, preventing a station that uses a rogue carrier sensing method from detecting a vacant medium, and as a result avoiding transmission from a rogue station, thereby eliminating variance of outbound transmission times by different beams of a given group; and (ii) each station polled with the object of a confirmation response in an uplink phase transmitting a confirmation response frame indicating a negative response—that is, each station ignoring a confirmation response request—thereby not permitting a gap exceeding a CIFS period in a transmission structure.

(30) The method described in (1) above that detects and handles the existence of a rogue station in a wireless network, comprising the steps of: (i) detecting that there is a rogue station if observing that transmission ended in failure in all beams at the same time; and (ii) in case of detection of the existence of the rogue station described in (i), switching to unsupervised access mode and directing that rogue station to transfer to another channel.

(31) A method whereby an access point in the system described in (i) above executes stream permission for a resource reservation request, comprising the steps of: (i) analyzing the transmission source address and transmission destination address of a stream, and determining whether or not both addresses exist in the same wireless network; and (ii) requesting the AP to assure resource use in one group/beam or other (for a conventional example of a system that uses an omni-directional antenna) before accepting a request.

(32) A method whereby users (AP and stations) of the system described in (1) above execute power control and limit channel interference with respect to other users, thereby leading to a reduction in transmission power, and consequently to battery savings, comprising the steps of: (i) embedding the transmission power level used in transmission of a specific frame/packet in the transmit signal; (ii) measuring reception power corresponding to specific packet transmission in a receiver; and (iii) comparing the value obtained by decoding information coded in the transmission described in (i) with the value described in (ii), and adjusting the transmission power of the next packet sent by the transmitter of the packet described in (i) accordingly.

This application is based on Japanese Patent Application No. 2003-276987 filed on Jul. 18, 2003, the entire content of which is expressly incorporated by reference herein.

INDUSTRIAL APPLICABILITY

The present invention is applicable to an 802.11 type WLAN that uses the protocol detailed in this text and comprises an SDMA compatible multi-beam antenna equipped AP and stations.

The invention claimed is:

1. A medium access control system in a wireless network, comprising:

an access point equipped with a space division multiple access (SDMA) compatible multi-beam antenna and a plurality of transceivers that can respectively be simultaneously connected to different antenna beams and transmit data using a superframe, and one or more stations spaced apart in a reception space of a wireless local area network (LAN), wherein the superframe has a timing structure comprising:

(i) a periodically transmitted beacon frame transmitted by the access point that reports existence of a wireless network and provides a timing reference to each station on the network;

(ii) a supervised access mode that is a period in which the access point multi-beam antenna is configured in a directional pattern, the access point controls access to a wireless channel and adjusts transmission with a plurality of stations by utilizing multi-beam antenna characteristics such that simultaneous transmissions with the plurality of stations can be implemented on a same wireless channel, and each station follows predetermined rules defined by the access point or by a network coordinator;

(iii) an unsupervised access mode that is a period in which the access point multi-beam antenna is configured in an omni-directional pattern, and each station executes rule-free, contention-based access to a wireless channel; and (iv) signaling whereby the access point starts or terminates the supervised access mode or the unsupervised access mode, wherein:

the beacon frame provides each station with the multi-beam antenna characteristics of a directional pattern or omni-directional pattern;

when the multi-beam antenna characteristic is the directional pattern, the unsupervised access mode is executed in order to detect a new station in the reception space; and when the multi-beam antenna characteristic is the omni-directional pattern, the unsupervised access mode is executed in a case where a rogue station is detected in the reception space.

2. The system according to claim 1, further including a protocol stack comprising:

(i) a medium access control layer that defines an access rule whereby a plurality of wireless stations access a common medium;

(ii) a physical layer that performs actual data transmission and reception on a wireless channel; and (iii) a management entity that manages and adjusts operation of said medium access control layer and said physical layer in order to improve overall wireless network throughput.

3. The system according to claim 2, wherein said medium access control layer comprises:

(i) a contention based access mechanism whereby a carrier sensing mechanism is used and stations compete for a transmission medium based on one set of rules;

(ii) a polling based channel access mechanism whereby an access point can satisfy a band request of a specific station while maintaining a service quality level specified beforehand by that station; and (iii) a beam access coordinator that implements high throughput by adjusting data transfer between antennas and an access point and utilizing a function of a multi beam antenna using said contention based and said polling based access mechanisms.

4. The system according to claim 1, wherein said beacon frame described is broadcast by an access point, and has a function that reports existence of a WLAN and provides a timing reference to stations scattered on a network, and comprises:

(i) an identifier unique to said wireless network whereby each station can uniquely and explicitly identify an access point and therefore a specific network;

(ii) a wireless network function and protocol related information specially defined by implementation of an access point;

(iii) information describing a used frequency of a beacon broadcast by an access point on a wireless network; and (iv) a period in which a wireless network operates in the supervised access mode, and whereby a conventional station does not execute association or transmission in the superframe period, as a result of which effects on wireless network throughput due to such transmissions/collisions are minimized.

5. The system according to claim 4, wherein said wireless network function and protocol related information comprises:

(i) a protocol reference number that enables a station's medium access control protocol type to be confirmed;

(ii) antenna type and pattern;

(iii) antenna switching/operating functions; and (iv) station direction finding/positioning functions.

6. The system according to claim 1, wherein the access point, in response to said Association Request frame, transmits an Association Response frame request that accepts or denies a request of each station, and comprises information elements described in following (i), (iv), and (v), and further comprises information elements described in (ii) and (iii) according to a network configuration, said access point and station functions, and a structure of a transmitted Association Request:

(i) a wireless network identifier for acknowledging and responding to an Association Request created by a station;

(ii) a group identifier of a beam group used by an access point for communication with that station;

(iii) a beam identifier of a beam used by an access point for communication with that station;

(iv) an address of a station itself that is an Association Response transmission destination; and (v) information relating to request status (that is, success or failure) and characteristics and functions supported by an access point.

7. The system according to claim 1, wherein the access point transmits an Acquisition Request that requests transmission of a predetermined training sequence to a station for a certain period, and identifies a spatial location of that station with respect to itself using that transmission, said Acquisition Request comprising:
  (i) an address of a station that makes an Acquisition Request;
  (ii) an address of a station that is an Acquisition Request transmission destination; and
  (iii) transmission period or length of a training sequence requested in order to transmit an address to a specified station.

8. The system according to claim 1, wherein the access point transmits to a station a group ID assignment (Group ID Assign) frame that performs assignment to a specific beam group for further transmit/receive operations, said Group ID Assign frame comprising:
  (i) an access point address/WLAN ID;
  (ii) an address of a station that is a transmission destination of said Group ID Assign frame;
  (iii) a group ID determined by an access point and assigned to a station whose address was specified; and
  (iv) a beam identifier of a beam used by an access point in a next communication with a station whose address was specified.

9. The system according to claim 1, wherein the access point broadcasts to each station of a specific beam group a Beam Start Beacon frame that indicates a start of operation to users of that beam group, said Beam Start Beacon frame comprising:
  (i) an access point address/WLAN ID enabling identification of a transmission source for each station;
  (ii) information relating to wireless network functions and protocol;
  (iii) a group ID of said beam;
  (iv) a beam ID of said beam;
  (v) a period in which said group is active that is, a period in which an access point performs transmission/reception with users of said group before switching to a different pattern in order to handle users of another group;
  (vi) a frequency for transmitting a Beam Start Beacon that makes it possible for stations of said group and beam to achieve mutual synchronization; and
  (vii) a schedule of outbound transmissions created by an access point in a current group period.

10. The system according to claim 1, wherein the access point broadcasts to each station of a specific beam group a Beam End Beacon that indicates termination of operation to users of that beam group, said Beam End Beacon comprising:
  (i) an access point address/WLAN ID enabling identification of a transmission source for each station;
  (ii) information relating to wireless network functions and protocol;
  (iii) a group ID of said beam;
  (iv) a beam ID of said beam; and
  (v) a period in which said group is inactive, and said users can adopt an operating mode that facilitates a reduction in power consumption.

11. The system according to claim 1, wherein the access point transmits to each station of a specific beam a Poll+Supervised Contention Announcement frame that defines a wireless medium polling based medium access and contention based access schedule, said Poll+Supervised Contention Announcement frame comprising:
  (i) a polling list assigned to respective stations; and
  (ii) an information element that declares a medium for uplink contention based access use of a specified period known as a supervised contention access period.

12. The system according to claim 11, wherein said polling list comprises:
  (i) an address of a station for which polling based access is permitted;
  (ii) a polling time that is, a time when a station can start transmission;
  (iii) a polling period that is, a period for which a station can execute transmission; and
  (iv) a purpose of polling or permission for indicating to a station that polling is for a stream that requested a band beforehand, or to request reception confirmation for a downlink frame transmitted in the past.

13. The system according to claim 1, wherein the access point uses an SDMA compatible antenna capable of forming a sector shaped beam, characterized by:
  (i) comparatively stable gain in a passband that minimizes fluctuation of a reception power level for a user belonging to that beam; and
  (ii) sharp roll off that is, a narrow transition width such that a beam is generated at short intervals by an access point by suppressing occurrence of interference due to transmission from a particular beam to a user of a different beam, spectral efficiency is increased, and consequently high throughput is obtained.

14. The system according to claim 9, wherein a downlink schedule element of said Beam Start Beacon:
  (i) shows an outbound transmission schedule composed of a transmission destination address, transmission length, and time at which said transmission is performed; and
  (ii) shows an end of an outbound transmission schedule that is, a transmission time corresponding to a Poll+Supervised Contention Announcement frame and enables a station that is not scheduled to receive an outbound transmission in a given group period to execute power saving in a downlink period of that group period.

* * * * *